(12) United States Patent
Deemer et al.

(10) Patent No.: US 10,525,420 B2
(45) Date of Patent: Jan. 7, 2020

(54) COMPOSITIONS AND METHODS FOR IMPROVING THE ANTI-FOULING PROPERTIES OF POLYETHERSULFONE MEMBRANES

(71) Applicant: Board of Regents, The University of Texas System, Austin, TX (US)

(72) Inventors: Eva M. Deemer, El Paso, TX (US); William Shane Walker, El Paso, TX (US); Tallen A. Capt, El Paso, TX (US)

(73) Assignee: THE BOARD OF REGENTS OF THE UNIVERSITY OF TEXAS SYSTEM, Austin, TX (US)

( * ) Notice: Subject to any disclaimer, the term of this patent is extended or adjusted under 35 U.S.C. 154(b) by 53 days.

(21) Appl. No.: 15/257,896

(22) Filed: Sep. 6, 2016

(65) Prior Publication Data
US 2017/0326505 A1    Nov. 16, 2017

Related U.S. Application Data

(63) Continuation-in-part of application No. 14/776,148, filed as application No. PCT/US2014/027467 on Mar. 14, 2014, now abandoned.
(Continued)

(51) Int. Cl.
*B01D 65/08* (2006.01)
*B01D 67/00* (2006.01)
(Continued)

(52) U.S. Cl.
CPC ........... *B01D 71/021* (2013.01); *B01D 65/08* (2013.01); *B01D 67/006* (2013.01);
(Continued)

(58) Field of Classification Search
CPC .. B01D 71/02; B01D 63/082; B01D 67/0069; B01D 67/0072; B01D 69/02;
(Continued)

(56) References Cited

U.S. PATENT DOCUMENTS 7,071,247 B2    7/2006    Fischer et al.
7,459,121 B2    12/2008    Liang et al.
(Continued)

FOREIGN PATENT DOCUMENTS

KR    10-2012-0076131    7/2012
KR    10-2010-1211850    12/2012
(Continued)

OTHER PUBLICATIONS

Stankovich, S., et al., "Graphene-based composite materials", Nature, 442 (2006).*
(Continued)

*Primary Examiner* — Benjamin L Lebron
(74) *Attorney, Agent, or Firm* — Norton Rose Fulbright US LLP

(57) ABSTRACT

The present invention includes a treatment system and methods for removing waste or other agents from a fluid stream, the system comprising: an inlet flow path for receiving a fluid stream from a source outside the treatment system; a vessel for containing the fluid stream, the vessel comprising a permeable filter configured for biological and physical treatment of the fluid stream, the filter comprising one or more nano-thin film or polymer composite layers of carbon materials assembled in sp2 hybridized structures comprising carbon-carbon bonds, wherein the waste or agent is removed as it flows through pores in the film composite; and a drain fluidly connected to the vessel for discharging treated fluid stream from the vessel from which the waste or agents have been removed.

3 Claims, 35 Drawing Sheets

Related U.S. Application Data

(60) Provisional application No. 61/790,264, filed on Mar. 15, 2013.

(51) Int. Cl.

| | | |
|---|---|---|
| *B01D 69/02* | (2006.01) | |
| *B01D 69/12* | (2006.01) | |
| *B01D 71/02* | (2006.01) | |
| *B01D 71/44* | (2006.01) | |
| *B01D 71/68* | (2006.01) | |
| *C02F 1/44* | (2006.01) | |
| *B01D 69/14* | (2006.01) | |
| *C02F 101/00* | (2006.01) | |
| *C02F 101/30* | (2006.01) | |
| *C02F 101/32* | (2006.01) | |

(52) U.S. Cl.
CPC ......... *B01D 67/0079* (2013.01); *B01D 69/02* (2013.01); *B01D 69/12* (2013.01); *B01D 69/148* (2013.01); *C02F 1/442* (2013.01); *B01D 67/0009* (2013.01); *B01D 71/44* (2013.01); *B01D 71/68* (2013.01); *B01D 2325/022* (2013.01); *C02F 2101/006* (2013.01); *C02F 2101/308* (2013.01); *C02F 2101/32* (2013.01); *C02F 2305/08* (2013.01)

(58) Field of Classification Search
CPC ...... B01D 69/12; B01D 61/025; B01D 65/08; B01D 2325/02; B01D 67/0009; B01D 67/006; B01D 67/079; B01D 69/148; B01D 71/021; B01D 71/44; B01D 71/68; B01D 2325/022; C02F 1/44; C02F 2101/006; C02F 2101/308; C02F 2101/32; C02F 2103/343; C02F 2103/365; C02F 2305/08; C02F 1/442
See application file for complete search history.

(56) References Cited

U.S. PATENT DOCUMENTS

| | | |
|---|---|---|
| 2008/0185341 A1 | 8/2008 | Diallo |
| 2011/0114573 A1 | 5/2011 | Simpson et al. |
| 2012/0255899 A1 | 10/2012 | Choi et al. |

FOREIGN PATENT DOCUMENTS

| | | | |
|---|---|---|---|
| WO | WO-2012102678 A1 * | 8/2012 | ......... B01D 67/0009 |
| WO | WO 2012/170086 | 12/2012 | |
| WO | WO 2014/027197 | 2/2014 | |

OTHER PUBLICATIONS

Wang, Z., et al., "Novel GO-blended PVDF ultrafiltration membranes", Desalination, 299, pp. 50-54, (2012).*
Zinadini, S., et al., "Preparation of a novel antifouling mixed matrix PES membrane by embedding graphene oxide nanoplates", Journal of Membrane Science, 453, pp. 292-301 (2014).*
Zhao, H., et al., "Improving the antifouling property of polysulfone ultrafiltration membrane by incorporation of isocyanate-treated graphene oxide", Phys. Chem. Chem. Phys., 15, pp. 9084-9092 (Year: 2013).*
Boukhvalov et al. "Modeling of graphite oxide." *J. Am. Chem. Soc.*, 2008, vol. 130, pp. 10697-10701.
Brodie, *Philos. Trans. R. Soc. London.*, 149: 249-259, 1859.
Cai et al. "Synthesis and solid-state NMR structural characterization of 13C-labeled graphite oxide." *Science.*, 2008, vol. 321, pp. 1815-1817.
Ding et al. "The influence of temperature, time and concentration on the dispersion of reduced graphene oxide prepared by hydrothermal reduction." *Diamonds & Related Materials*, 2012, vol. 21, pp. 11-15.
He et al. "A new structural model for graphite oxide." *Chem Phys. Lett.*, 1998, vol. 287, pp. 53-56.
Huang, "Salt concentration, pH and pressure controlled separation of small molecules through lamellar graphene oxide membranes." *Chem. Commun.*, 2013, vol. 49, pp. 5963-5965.
International Search Report and Written Opinion issued in PCT/US2014/027467, dated Sep. 26, 2014.
Kang et al., "High-performance electronics using dense, perfectly aligned arrays of single-walled carbon nanotubes." *Nat. Nanotechol.*, 2007, vol. 2, pp. 230-236.
Nair et al., "Unimpeded permeation of water through helium-leak-tight graphene-based membranes." *Science*, 2012, vol. 335, pp. 442-444.
Paredes et al., "Graphene oxide dispersions in organic solvents." *Langmuir.*, 2008, vol. 24, pp. 10560-10564.
Shin et al., "Efficient Reduction of Graphite Oxide by Sodium Borohydride and its Effect on Electrical Conductance," *Adv. Funct. Mater.*, 2009, vol. 19, No. 12, pp. 1987-1992.
Si et al. "Synthesis of water soluble graphene." *Nano. Lett.* 2008, vol. 8, No. 6, pp. 1679-1682.
Stankovich et al., "Synthesis of graphene-based nanosheets via chemical reduction of exfoliated graphite oxide," *Carbon*, 2007, vol. 45, No. 7, pp. 1558-1565.

* cited by examiner

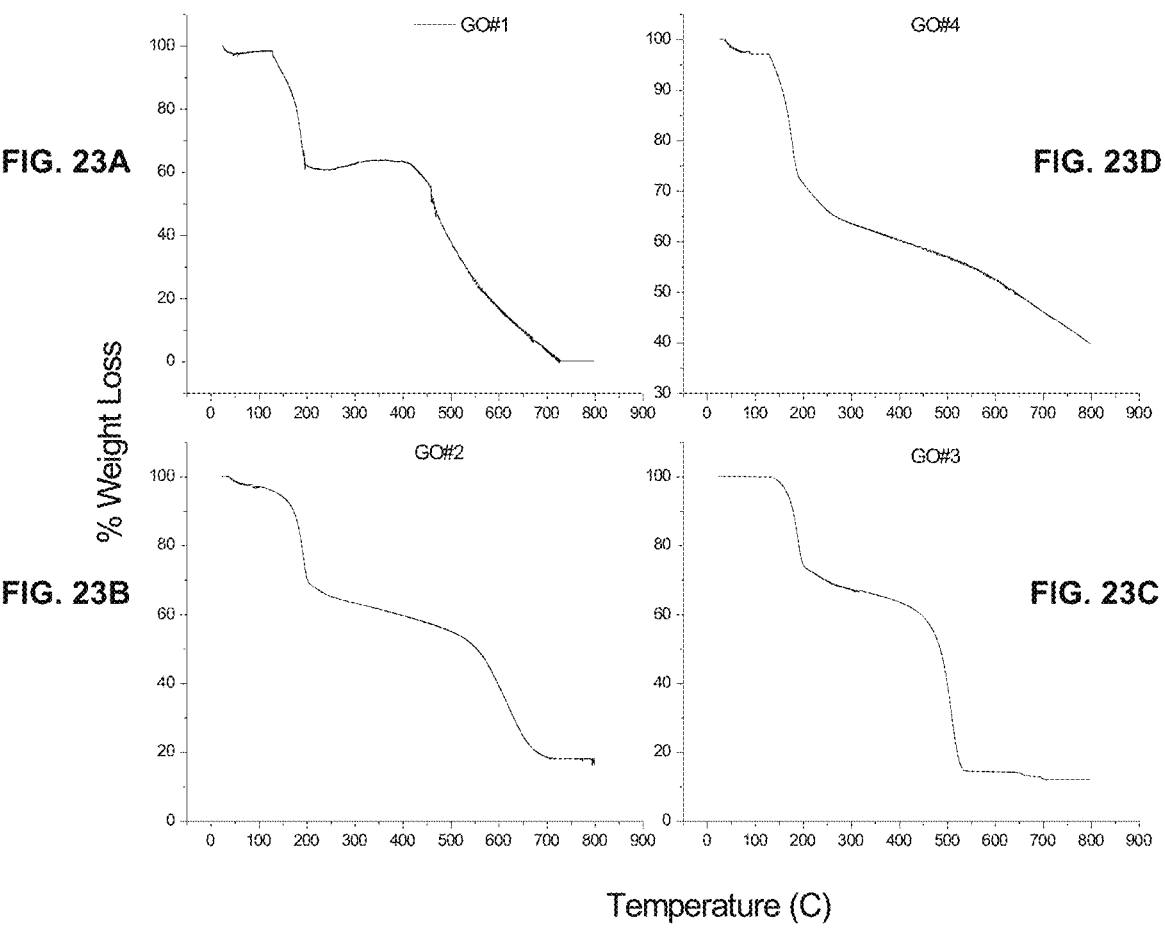

FIG. 32A
FIG. 32B
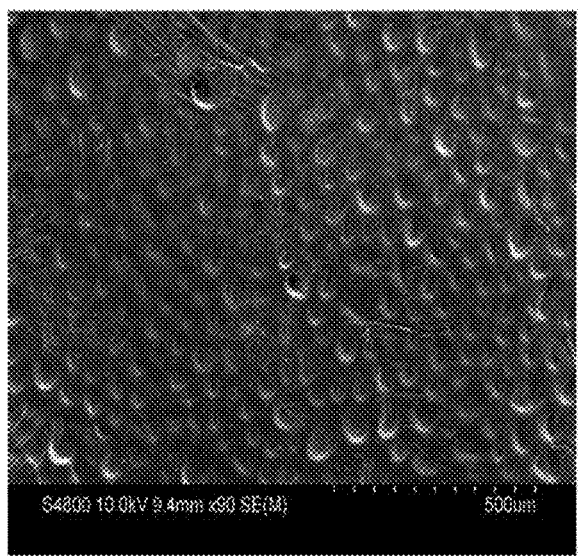
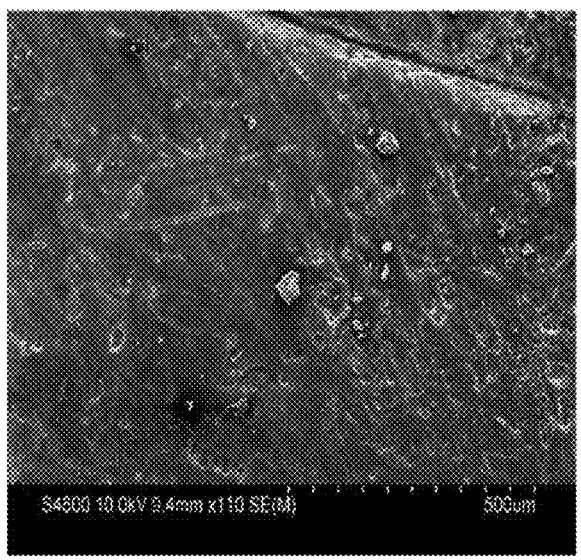

COMPOSITIONS AND METHODS FOR IMPROVING THE ANTI-FOULING PROPERTIES OF POLYETHERSULFONE MEMBRANES

CROSS-REFERENCE TO RELATED APPLICATIONS

This application is a continuation-in-part of U.S. application Ser. No. 14/776,148, filed on Sep. 14, 2015, incorporated herein by reference; which in turn claims priority to International Application Serial No. PCT/US2014/027,467, filed on Mar. 14, 2014, incorporated herein by reference; which in turn claims priority under 35 USC § 119(e)(1) to U.S. Provisional Application No. 61/790,264, filed Mar. 15, 2013, incorporated herein by reference.

STATEMENT REGARDING FEDERALLY SPONSORED RESEARCH

Not applicable.

TECHNICAL FIELD OF THE INVENTION

The present invention relates in general to the field of filtration of waste streams, and more particularly, to nanocomposites with, e.g., nanochannels or nanopores, for filtration of waste effluents.

BACKGROUND

Without limiting the scope of the invention, its background is described in connection with filtration methods and compositions.

One such invention is found in U.S. Pat. No. 7,459,121, issued to Liang, et al., directed to a method for continuous fabrication of carbon nanotube networks or membrane materials. Briefly, this patent is said to teach methods and devices for the continuous production of a network of nanotubes or other nanoscale fibers. The method is also said to include making a suspension of nanoscale fibers dispersed in a liquid medium, optionally with surfactant and/or sonication, and filtering the suspension by moving a filter membrane through the suspension, such that the nanoscale fibers are deposited directly on the filter membrane as the fluid medium flows through the filter membrane, to form a continuous membrane of nanoscale fibers. The deposition of the nanoscale fibers can occur when and where the filter membrane moves into contact with a static, porous filter element or a dynamic, porous filter element. The filtering can be conducted within a magnetic field effective to align the nanoscale fibers, and/or with the aid of vacuum to pull water through the filter membrane, applied pressure to press water though the filter membrane, or a combination thereof.

Another invention is said to be taught in U.S. Pat. No. 7,071,247, issued to Fischer, directed to a reinforced filter material. Briefly, this invention is said to teach a porous mold for use in a pressure casting process, which mold is manufactured of a polymeric material forming a matrix into which a clay and a block copolymer or a graft copolymer have been incorporated, wherein the block copolymer or graft copolymer comprises one or more first structural units (A), which are compatible with the clay, and one or more second structural units (B), which are compatible with the polymeric matrix. The invention further relates to a process for producing said mold and to the use of said mold in a pressure casting process.

United States Patent Application No. 20080185341, filed by Diallo, which is directed to water treatment by dendrimer-enhanced filtration. Briefly, the application teaches compositions and methods useful for the purification of aqueous fluids using dendritic macromolecules. The process is said to involve using dendritic macromolecules (dendrimers) to bind to or chemically transform solutes, and a filtration step to produce fluid from which solutes have been removed or chemically transformed. Examples of dendrimers that may be used in the process include cation-binding dendrimers, anion-binding dendrimers, organic compound-binding dendrimers, redox-active dendrimers, biological compound-binding dendrimers, catalytic dendrimers, biocidal dendrimers, viral-binding dendrimers, multi-functional dendrimers, and combinations thereof. The process is said to be readily scalable and provides many options for customization.

WO 2014/027197A1 filed by Nair discloses uses of graphene oxide for vapor phase separation and methods of dehydration for the separation of water using a membrane. Graphene oxide was shown to allow unimpeded permeation of water (Nair et al. Science, 2012, 335,442-444) but this work does not disclose any practical applications on this material as a membrane, (cited in paragraph [0012] in WO 2014/027197 A1).

SUMMARY

In view of the aforementioned problems and trends, general embodiments of the present disclosure provide compositions and methods for producing metal-doped graphene and the metal-doped graphene derivatives from pitch.

The present invention includes a treatment system and methods for removing waste or other agents from a fluid stream, the system comprising: an inlet flow path for receiving a fluid stream from a source outside the treatment system; a vessel for containing the fluid stream, the vessel comprising a permeable filter configured for biological and physical treatment of the fluid stream, the filter comprising one or more nano-thin film or polymer composite layers of carbon materials assembled in sp2 hybridized structures comprising carbon-carbon bonds, wherein the waste or agent is removed as it flows through pores in the film composite; and a drain fluidly connected to the vessel for discharging treated fluid stream from the vessel from which the waste or agents have been removed.

In one aspect, the filter further comprises at least one of graphene materials with heteroatoms such as oxygen, nitrogen, hydrogen, sulfur, or other metal containing species such as a metal dichalcogenide.

In another aspect, the filter is made permeable by at least one of chemical doping with heteroatoms, chemical destruction of lattice by UV-Ozone treatments, chemical disruption of the lattice by bonding or by removal of areas using plasma, or electron beam lithography.

In another aspect, the filter comprises at least one channel opening for receiving the fluid stream.

In another aspect, the filter comprises connecting elements to releaseably connect a unit of stackable filter units that comprise one or more filters. In another aspect, the fluid stream comprises a gas or a liquid.

In another aspect, the fluid stream comprises water, wastewater, oil, grease, biological entities, chemical dyes, heavy and radioactive waste.

In another aspect, the filter isolated the agent, wherein the agent is in extraction solvents that comprise petrochemicals, removal of free fatty acids, desulfurization, deacidification, solvent recovery in lube dewaxing, isolation and concentration of pharmaceuticals, and concentration and purification of bioactive compounds.

In another aspect, the filter comprises a single or multilayered thin layer composite.

In another aspect, the water is treated as it flows through pores in the film composite gravity.

In another aspect, the filtration is cross-flow, spiral wound or dead-end filtration. In another aspect, the different size nanochannels between or across sheets are functionalized with one or more heteroatoms to control the size exclusion of filtration.

In another aspect, the different specificity of one or more nanochannels formed between or across sheets are functionalized with one or more heteroatoms to control the specificity of filtration.

In another aspect, the filter is a graphene or graphene oxide filter.

Yet another embodiment of the present invention includes a filter comprising a plurality of stackable filter units, each of the filter units having a first planar surface and a second planar surface, the second planar surface having a filtering wall extending therefrom to an edge, wherein the second planar surface is designed for stacking alignment with the first planar surface of an adjacent filter unit and wherein the edge forms a filter aperture with the first planar surface of the adjacent filter unit, wherein the filter comprises nano-thin film or polymer composite layers of carbon materials assembled in sp2 hybridized structures comprising carbon-carbon bonds.

In one aspect, the filter further comprises at least one of graphene materials with heteroatoms such as oxygen, nitrogen, hydrogen, sulfur or other metal containing species.

In another aspect, the filter is made permeable by at least one of chemical doping with heteroatoms, chemical destruction of lattice by UV-Ozone treatments, chemical disruption of the lattice by bonding or by removal of areas using plasma, or electron beam lithography.

In another aspect, the filter comprises at least one channel opening for receiving the fluid stream.

In another aspect, the filter comprises connecting elements to releasably connect a unit of stackable filter units that comprise one or more filters.

In another aspect, the fluid stream comprises a gas or a liquid. In another aspect, the fluid stream comprises water, wastewater, oil, grease, biological entities, chemical dyes, heavy and radioactive waste. In another aspect, wherein the filter isolated the agent, wherein the agent is in extraction solvents that comprise petrochemicals, removal of free fatty acids, desulfurization, deacidification, solvent recovery in lube dewaxing, isolation and concentration of pharmaceuticals, and concentration and purification of bioactive compounds.

In another aspect, the filter comprises a single or multilayered thin layer composite, wherein each layer comprises a different modification made by at least one of chemical doping with heteroatoms, chemical destruction of lattice by UV-Ozone treatments, chemical disruption of the lattice by bonding or by removal of areas using plasma, or electron beam lithography. In another aspect, the water is treated as it flows by gravity through pores in the film composite.

In another aspect, the filtration is cross-flow, spiral wound or dead-end filtration.

In another aspect, the different size nanochannels between or across sheets are functionalized with one or more heteroatoms to control the size exclusion of filtration.

In another aspect, the different specificity of one or more nanochannels formed between or across sheets are functionalized with one or more heteroatoms to control the specificity of filtration.

In another embodiment, the present invention includes a method for filtering waste or an agent from a fluid stream, the method comprising: receiving a fluid stream from a source outside a treatment system; contacting the fluid stream with a filter configured for biological and physical treatment of the wastewater, the filter comprising one or more nano-thin film or polymer composite layers of carbon materials assemble in sp2 hybridized structures comprising carbon-carbon bonds, wherein the wastewater is treated as it flows by gravity through pores in the film composite; and draining a discharge fluid stream from the treatment system.

In one aspect, the filter further comprises at least one of graphene materials with heteroatoms such as oxygen, nitrogen, hydrogen, sulfur or other metal containing species.

In another aspect, the filter is made permeable by at least one of chemical doping with heteroatoms, chemical destruction of lattice by UV-Ozone treatments, chemical disruption of the lattice by bonding or by removal of areas using plasma, or electron beam lithography.

In another aspect, the filter comprises at least one channel opening for receiving the fluid stream.

In another aspect, the filter comprises connecting elements to releasably connect a unit of stackable filter units that comprise one or more filters.

In another aspect, the fluid stream comprises a gas or a liquid. In another aspect, the fluid stream comprises water, wastewater, oil, grease, biological entities, chemical dyes, heavy and radioactive waste.

In another aspect, the filter isolated the agent, wherein the agent is in extraction solvents that comprise petrochemicals, removal of free fatty acids, desulfurization, deacidification, solvent recovery in lube dewaxing, isolation and concentration of pharmaceuticals, and concentration and purification of bioactive compounds.

In another aspect, the filter comprises a single or multilayered thin layer composite.

In another aspect, the method further comprises the step of pre-filtering large solids before entering the filter. In another aspect, the water is treated as it flows through pores in the film composite gravity.

In another aspect, the filtration is cross-flow, spiral wound or dead-end filtration. In another aspect, the different size nanochannels between or across sheets are functionalized with one or more heteroatoms to control the size exclusion of filtration.

In another aspect, the different specificity of one or more nanochannels formed between or across sheets are functionalized with one or more heteroatoms to control the specificity of filtration.

In another aspect, the filter is a graphene or graphene oxide filter.

Another embodiment of the present invention includes a treatment system for removing waste or other agents from a fluid stream, the system comprising: an inlet flow path for receiving a fluid stream from a source outside the treatment system; a permeable filter configured for biological and physical treatment of the fluid stream, the filter comprising one or more nano-thin film or polymer composite layers of carbon materials assembled in sp2 hybridized structures comprising carbon-carbon bonds, wherein the waste or agent is removed as it flows through pores in the film composite; and a drain for discharging treated fluid stream from which the waste or agents have been removed.

In another aspect, the filter is made permeable by at least one of chemical doping with heteroatoms, chemical destruction of lattice by UV-Ozone treatments, chemical disruption of the lattice by bonding or by removal of areas using plasma, or electron beam lithography.

In another aspect, the filter comprises at least one channel opening for receiving the fluid stream.

In another aspect, the filter comprises connecting elements to releasably connect a unit of stackable filter units that comprise one or more filters.

In another aspect, the fluid stream comprises a gas or a liquid. In another aspect, the fluid stream comprises water, wastewater, oil, grease, biological entities, chemical dyes, heavy and radioactive waste.

In another aspect, the filter isolated the agent, wherein the agent is in extraction solvents that comprise petrochemicals, removal of free fatty acids, desulfurization, deacidification, solvent recovery in lube dewaxing, isolation and concentration of pharmaceuticals, and concentration and purification of bioactive compounds.

In another aspect, the filter comprises a single or multi-layered thin layer composite.

In another aspect, the water is treated as it flows through pores in the film composite gravity.

In another aspect, the filtration is cross-flow, spiral wound or dead-end filtration.

In another aspect, the different size nanochannels between or across sheets are functionalized with one or more heteroatoms to control the size exclusion of filtration.

In another aspect, the different specificity of one or more nanochannels formed between or across sheets are functionalized with one or more heteroatoms to control the specificity of filtration.

In another aspect, the filter is a graphene or graphene oxide filter.

The present invention provides a treatment system for removing one or more agents from a fluid stream, the treatment system comprising: a vessel housing comprising a housing inlet and a housing outlet; an inlet flow path fluidly connected to the housing inlet to transport a fluid stream from a source to the vessel housing; a drain fluidly connected to the housing outlet to discharge a treated fluid stream from the vessel; a permeable graphene filter for biological treatment, physical treatment or both of the fluid stream positioned between the housing inlet and the housing outlet to remove one or more agents from the fluid stream to form the treated fluid stream, wherein the permeable graphene filter comprises a polymer composite of one or more layers of a graphene material assembled in sp2 hybridized structures comprising carbon-carbon bonds and the permeable graphene filter is made permeable by chemical doping with heteroatoms, chemical destruction of lattice by UV-Ozone treatments, chemical disruption of the lattice by bonding or by removal of areas using plasma, or electron beam lithography.

The graphene material comprises a graphene or a graphene oxide and further include one or more heteroatoms selected from oxygen, nitrogen, hydrogen, sulfur, or one or more metals.

The permeable graphene filter may include at least one channel opening for receiving the fluid stream and may be a single or multilayered thin layer composite.

The vessel housing comprises 2 or more permeable graphene filters.

The 2 or more permeable graphene filters may include different size nanochannels positioned between or across the 2 or more permeable graphene filter and functionalized with one or more heteroatoms to control a size exclusion of a filtration, to control a specificity of a filtration or both.

The 2 or more permeable graphene filters may be 2, 3, 4, 5, 6, 7, 8, 9, 10, 11, 12, 13, 14, 15, 16, 17, 18, 19, 20, 25, 30, 40, 50 or more graphene filters.

The 2 or more permeable graphene filters may be cross-flow, spiral wound or dead-end filtration or a combination thereof.

The fluid stream may be a gas, a liquid, or a combination that may or may not include solids.

The fluid stream comprises one or more selected from water, wastewater, oil, grease, oil, biological molecules, chemicals, organic molecules, inorganic molecules, chemical dyes, petrochemicals, pharmaceuticals, heavy and radioactive waste.

The permeable graphene filter extracts solvents that comprise petrochemicals, removes free fatty acids, performs a desulfurization, performs a deacidification, performs a solvent recovery in lube dewaxing, isolates and/or concentrates pharmaceuticals, or concentration and/or purifies bioactive compounds.

The present invention provides a stackable filter unit comprising: 1 or more permeable graphene filters wherein each or the 1 or more permeable graphene filters comprise a first planar surface opposite a second planar surface separated by a filtering wall, wherein the second planar surface is designed to mate with the first planar surface of a second permeable graphene filter a nano-thin film or polymer composite layer for biological treatment, physical treatment or both placed in contact with the first planar surface, the second planar surface or both, wherein the nano-thin film or polymer composite layer comprises one or more layers of a graphene material assembled in sp2 hybridized structures comprising carbon-carbon bonds and the permeable graphene filter is made permeable by chemical doping with heteroatoms, chemical destruction of lattice by UV-Ozone treatments, chemical disruption of the lattice by bonding or by removal of areas using plasma, or electron beam lithography.

The graphene material comprises a graphene or a graphene oxide and further include one or more heteroatoms selected from oxygen, nitrogen, hydrogen, sulfur, or one or more metals.

The permeable graphene filter may include at least one channel opening for receiving the fluid stream and may be a single or multilayered thin layer composite. The vessel housing comprises 2 or more permeable graphene filters.

The 2 or more permeable graphene filters may include different size nanochannels positioned between or across the 2 or more permeable graphene filter and functionalized with one or more heteroatoms to control a size exclusion of a filtration, to control a specificity of a filtration or both.

The 2 or more permeable graphene filters may be 2, 3, 4, 5, 6, 7, 8, 9, 10, 11, 12, 13, 14, 15, 16, 17, 18, 19, 20, 25, 30, 40, 50 or more graphene filters.

The 2 or more permeable graphene filters may be cross-flow, spiral wound or dead-end filtration or a combination thereof.

The fluid stream may be a gas, a liquid, or a combination that may or may not include solids.

The fluid stream comprises one or more selected from water, wastewater, oil, grease, oil, biological molecules, chemicals, organic molecules, inorganic molecules, chemical dyes, petrochemicals, pharmaceuticals, heavy and radioactive waste. The permeable graphene filter extracts solvents that comprise petrochemicals, removes free fatty acids, performs a desulfurization, performs a deacidification, performs a solvent recovery in lube dewaxing, isolates and/or concentrates pharmaceuticals, or concentration and/or purifies bioactive compounds.

The present invention provides a method for filtering waste or an agent from a fluid stream, the method comprising: receiving a fluid stream from a source outside a treatment system; and contacting the fluid stream with a permeable graphene filter configured for biological and physical treatment of the wastewater by removing one or more agents from the fluid stream to form the treated fluid stream, wherein the permeable graphene filter comprises a polymer composite one or more layers of a graphene material assembled in sp2 hybridized structures comprising carbon-carbon bonds and the permeable graphene filter is made permeable by chemical doping with heteroatoms, chemical destruction of lattice by UV-Ozone treatments, chemical disruption of the lattice by bonding or by removal of areas using plasma, or electron beam lithography; and discharging the treated fluid stream from the treatment system.

Other aspects of the embodiments described herein will become apparent from the following description and the accompanying drawings, illustrating the principles of the embodiments by way of example only.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

Figure 1A:
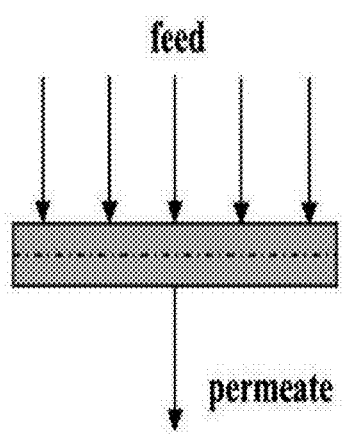
Figure 1B:
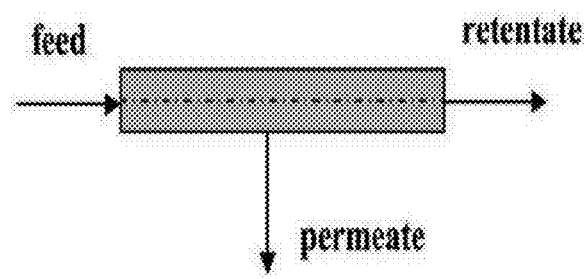
Figure 2:
Figure 3:
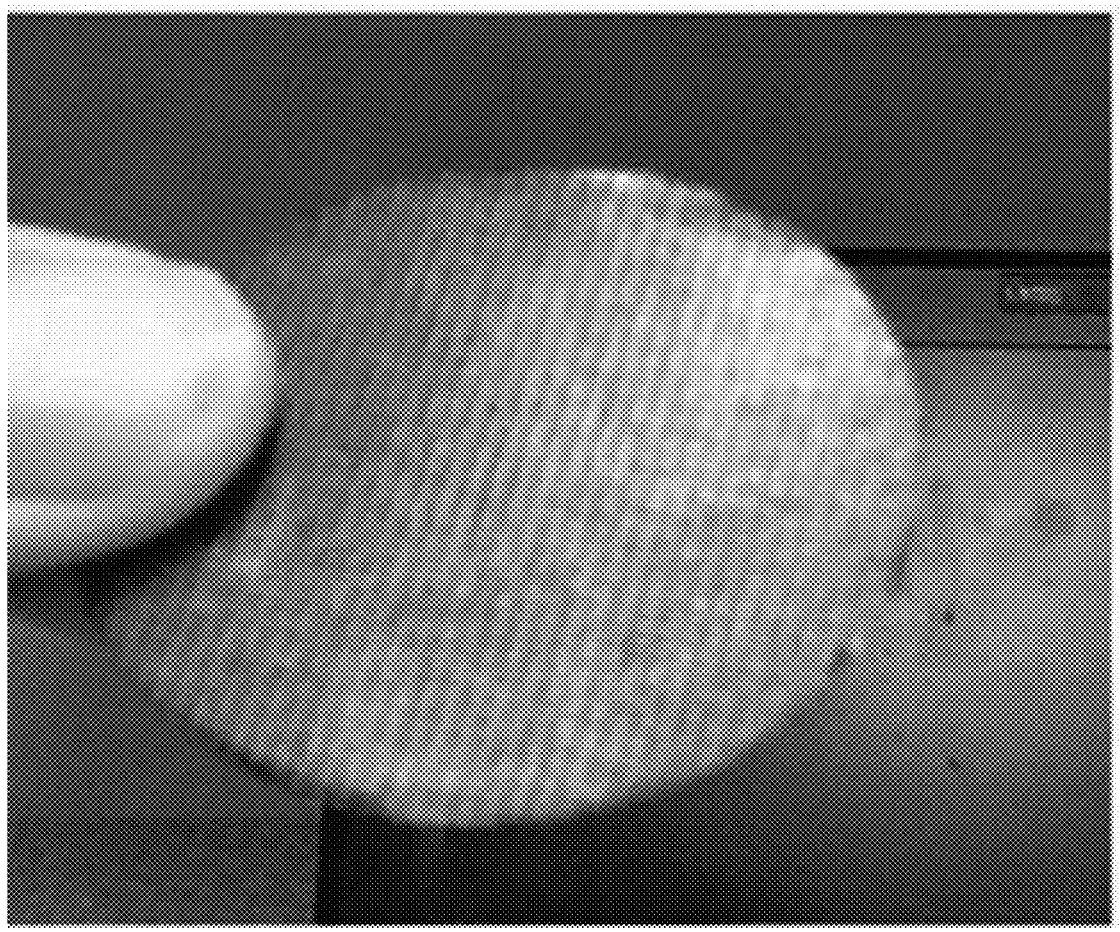
Figure 4:
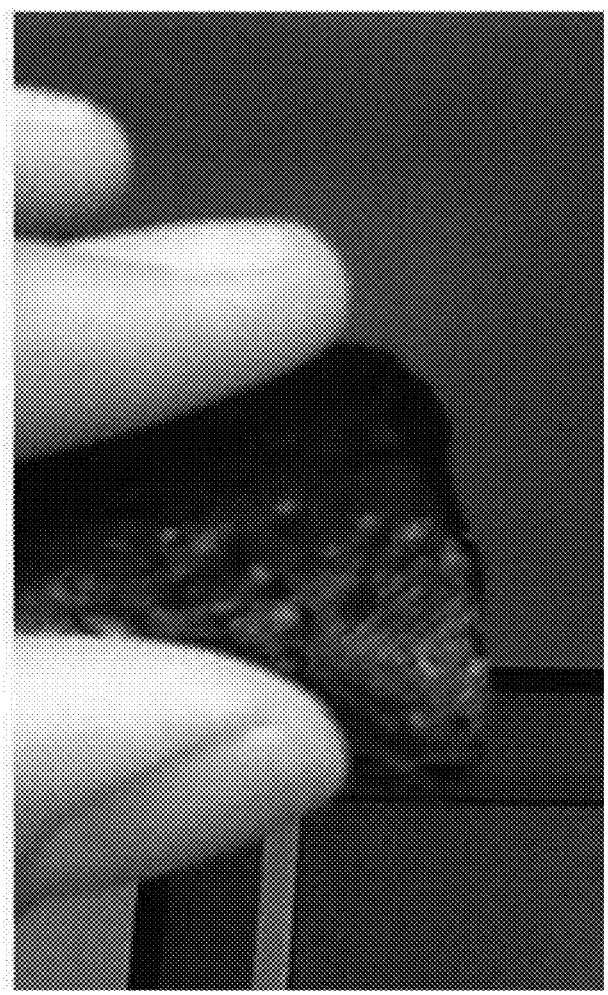
Figure 5:
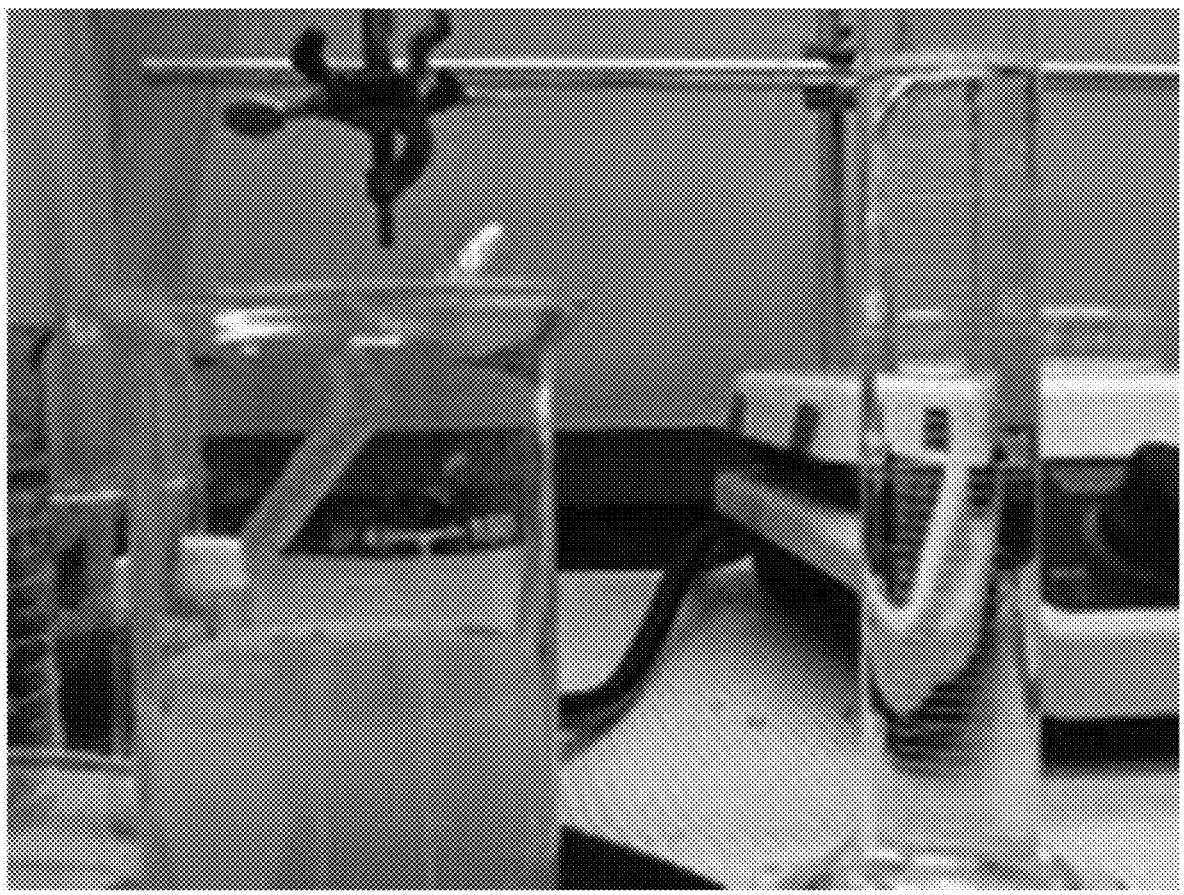
Figure 6:
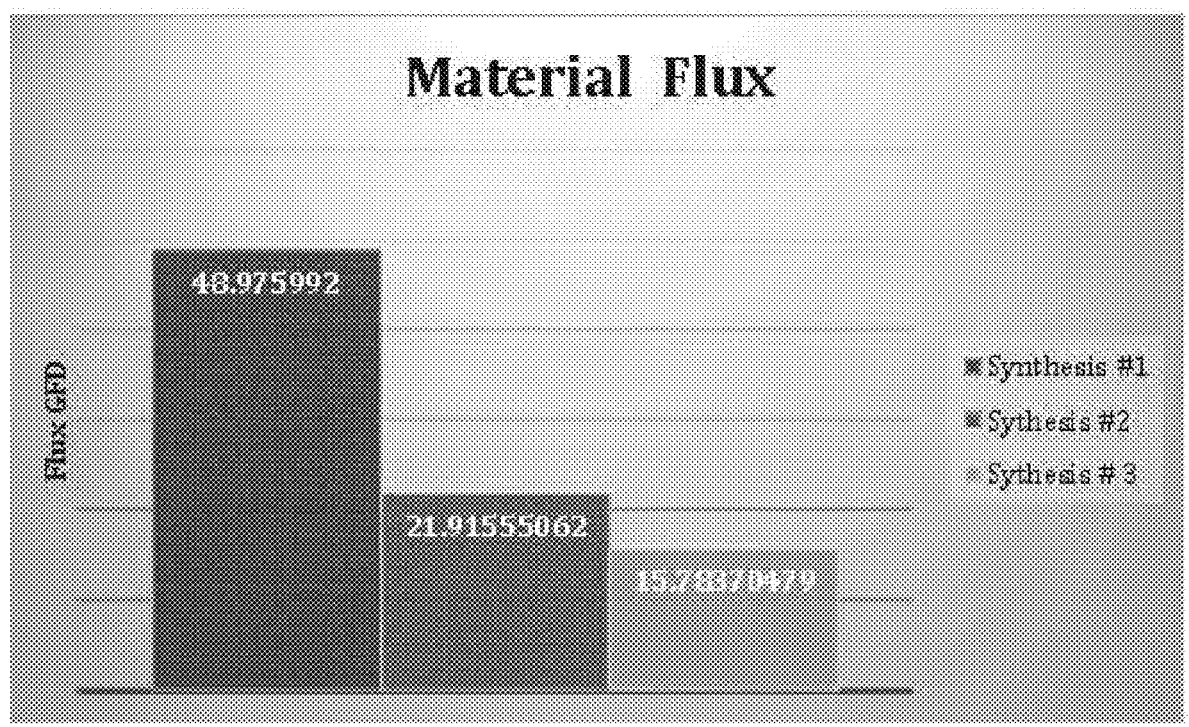
Figure 7:
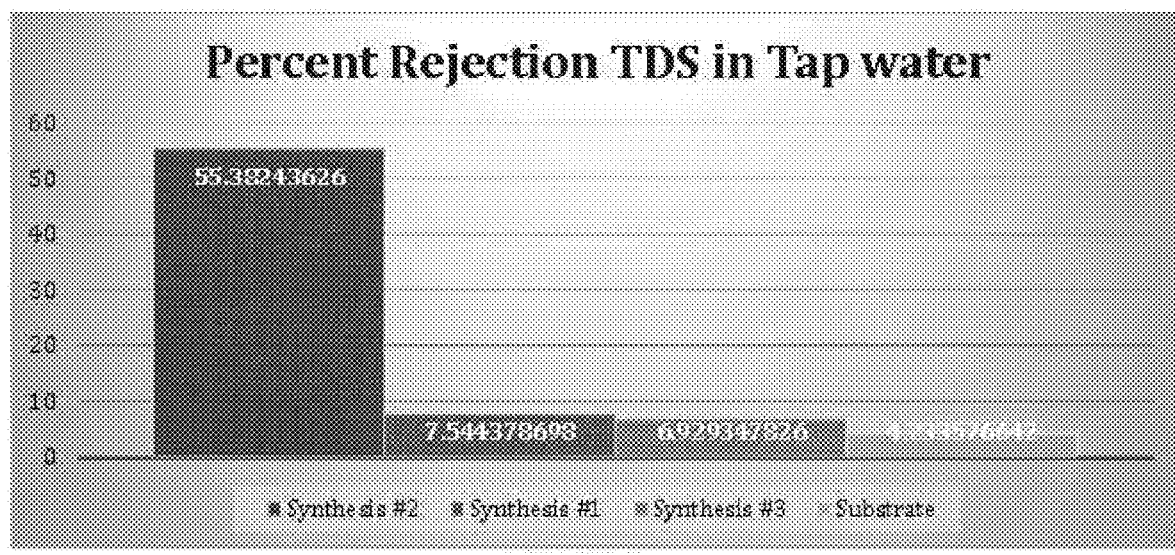
Figure 8:
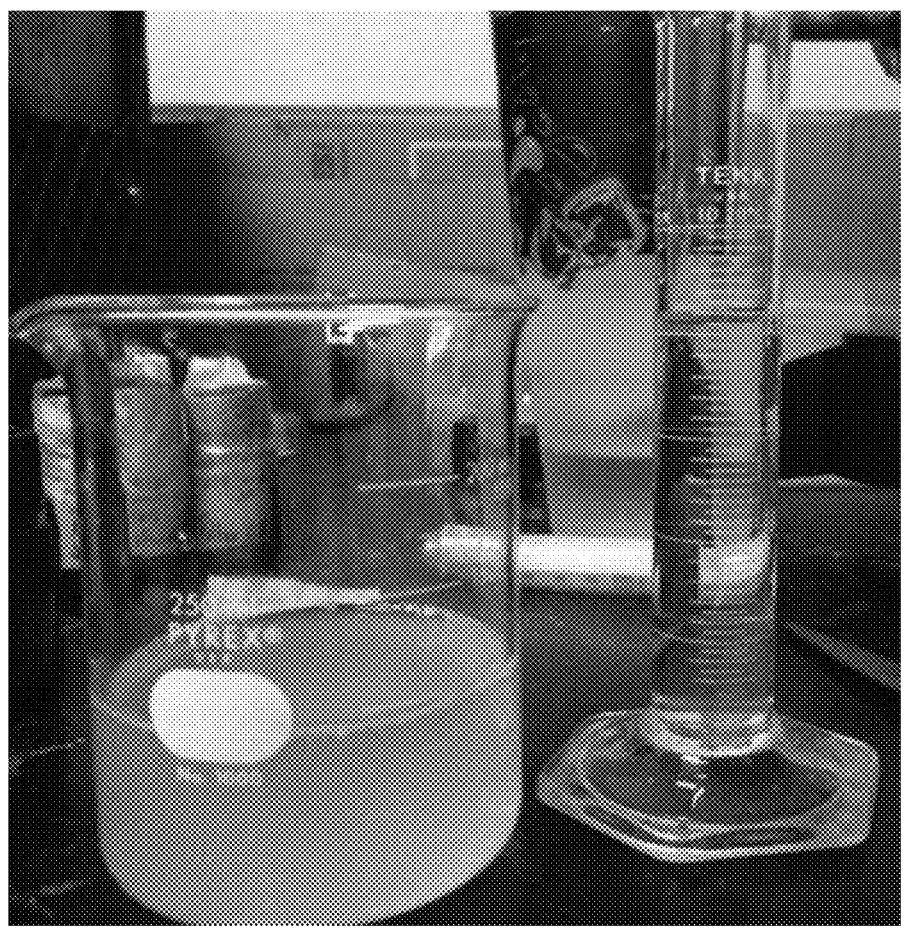
Figure 9:
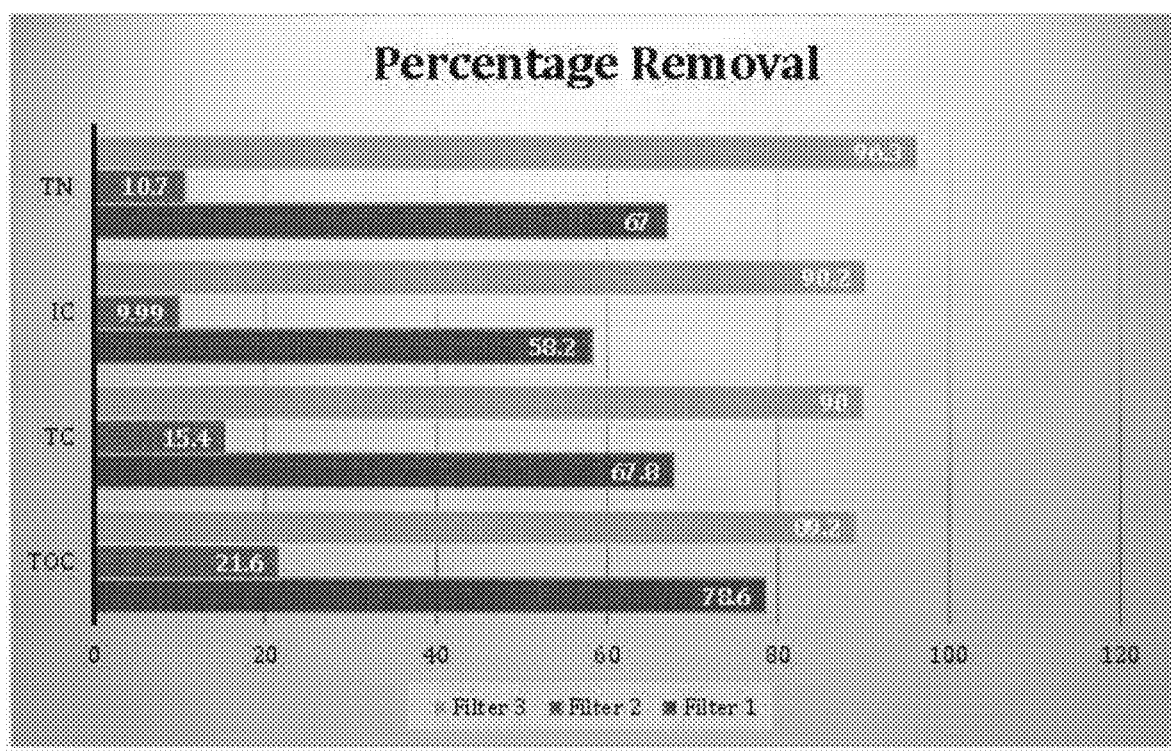
Figure 10:
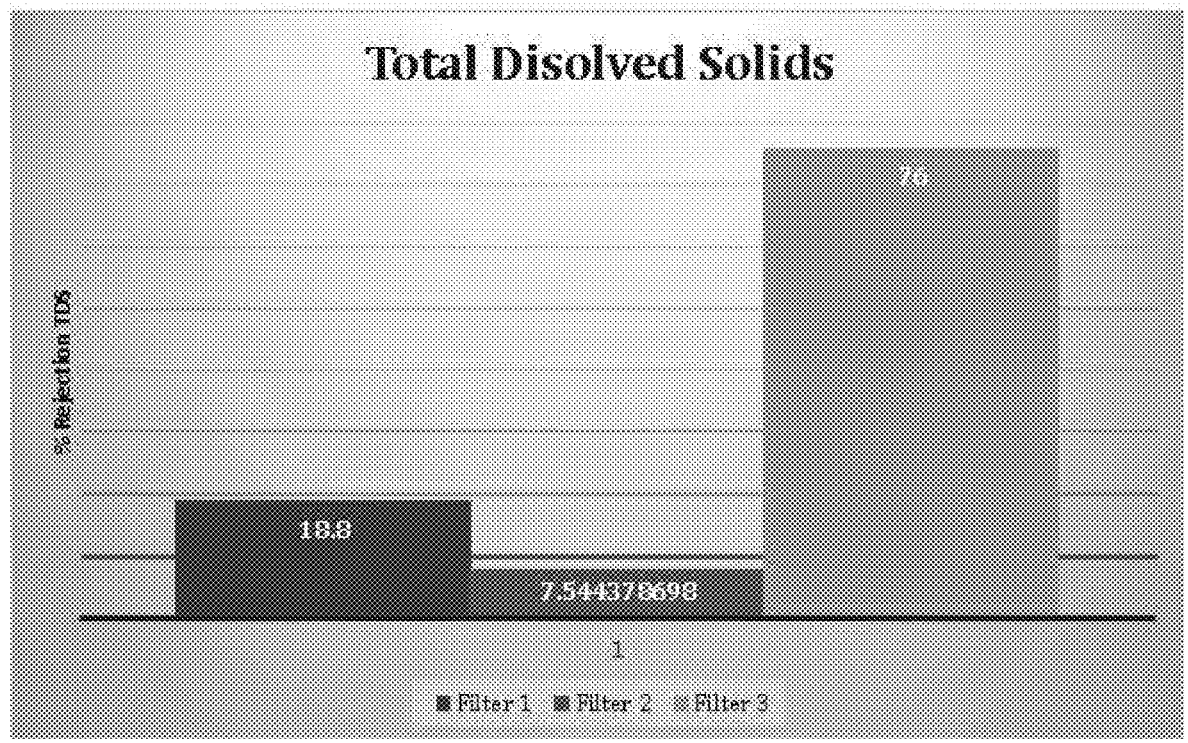
Figure 11:
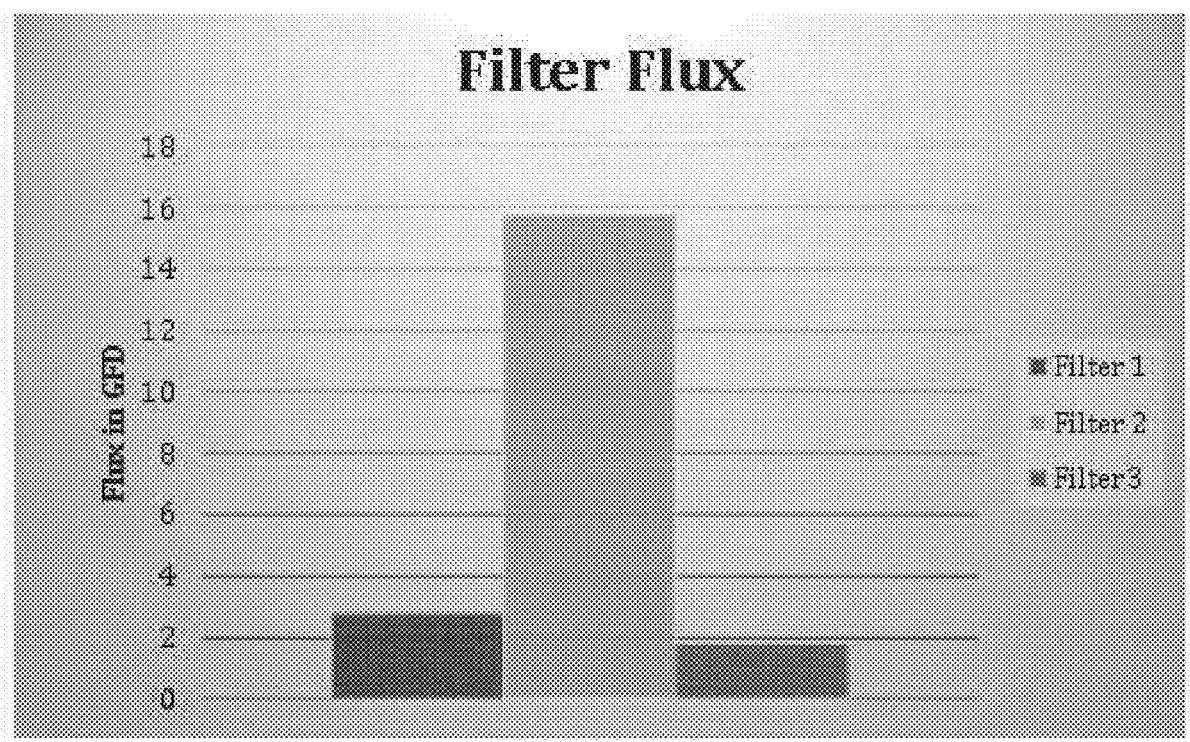
Figure 12:
Figure 13:
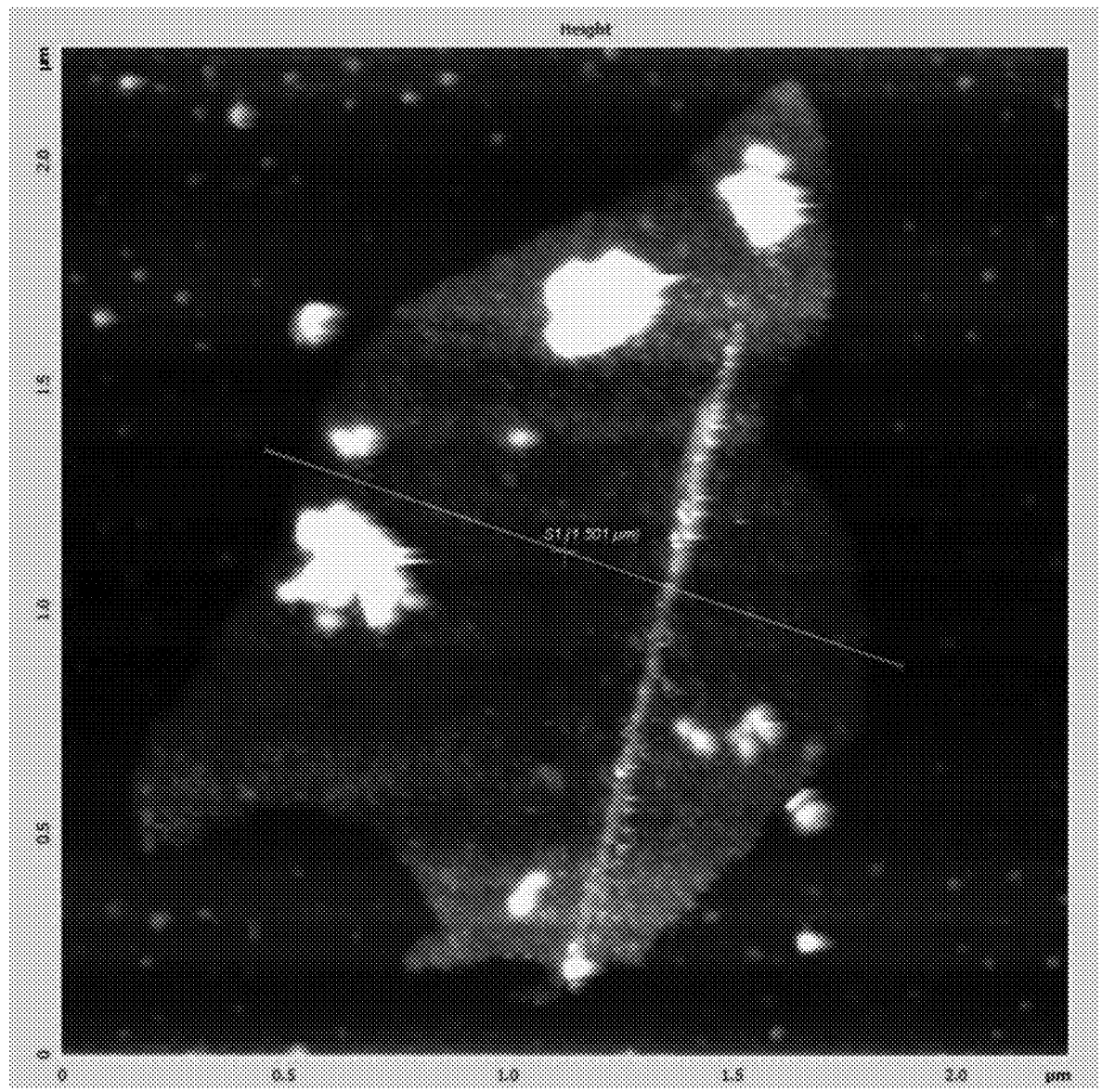
Figure 14A:
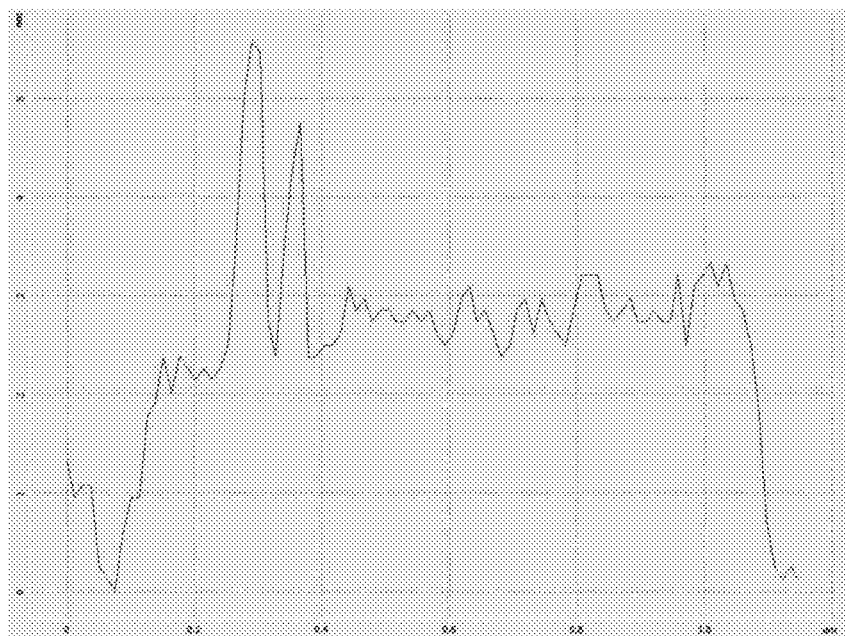
Figure 14B:
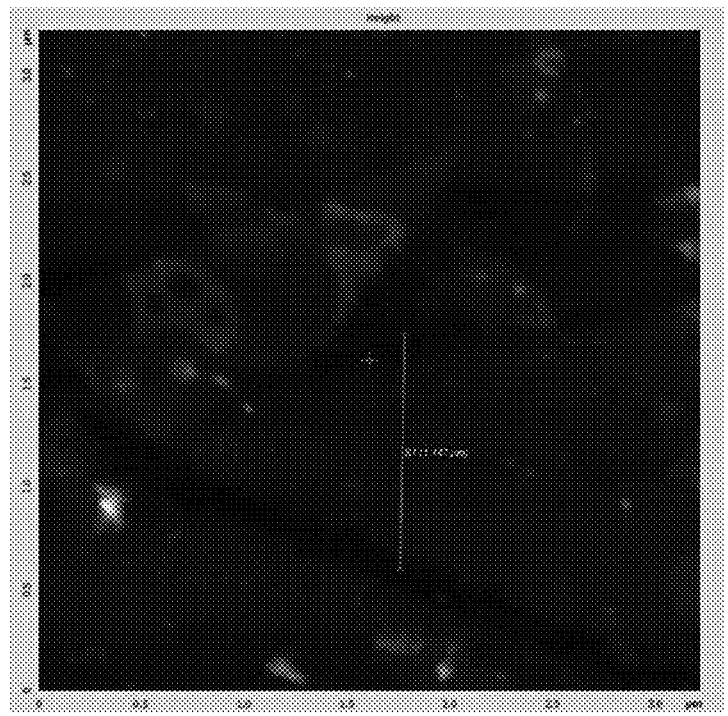
Figure 15A:
Figure 15B:
Figure 16A:
Figure 16B:
Figure 17:
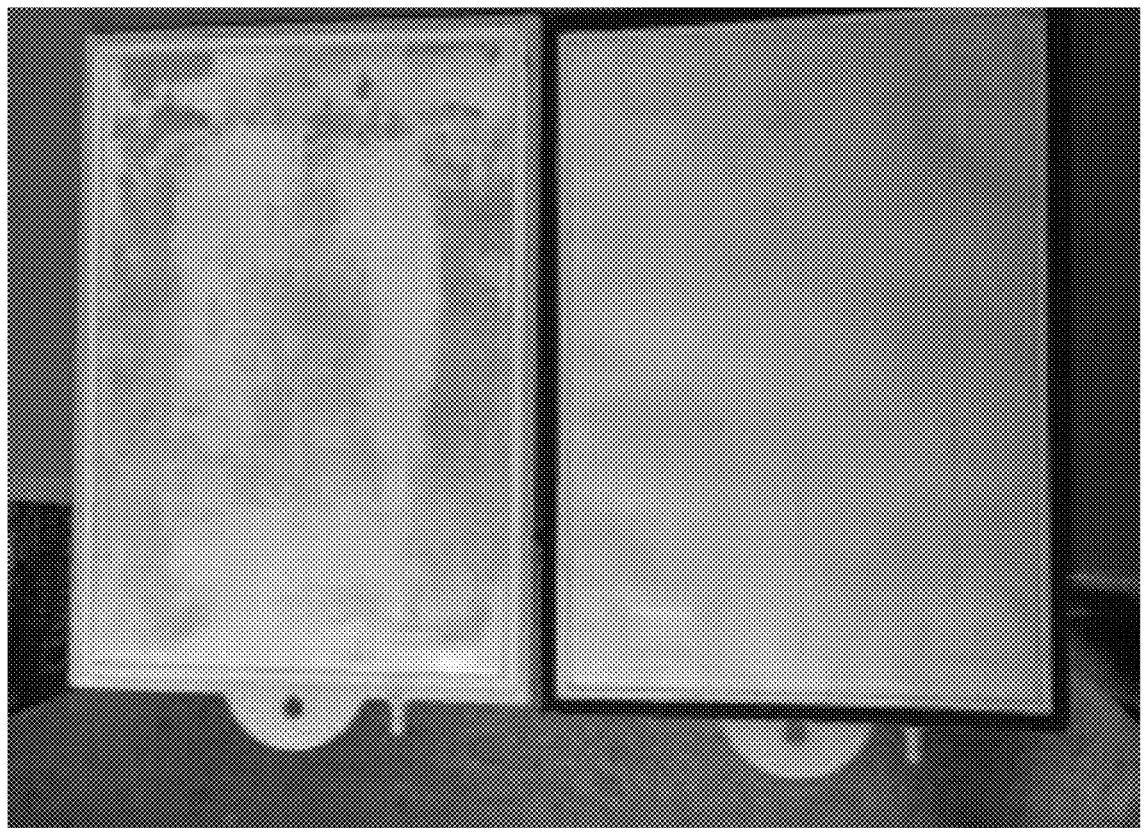
Figure 18:
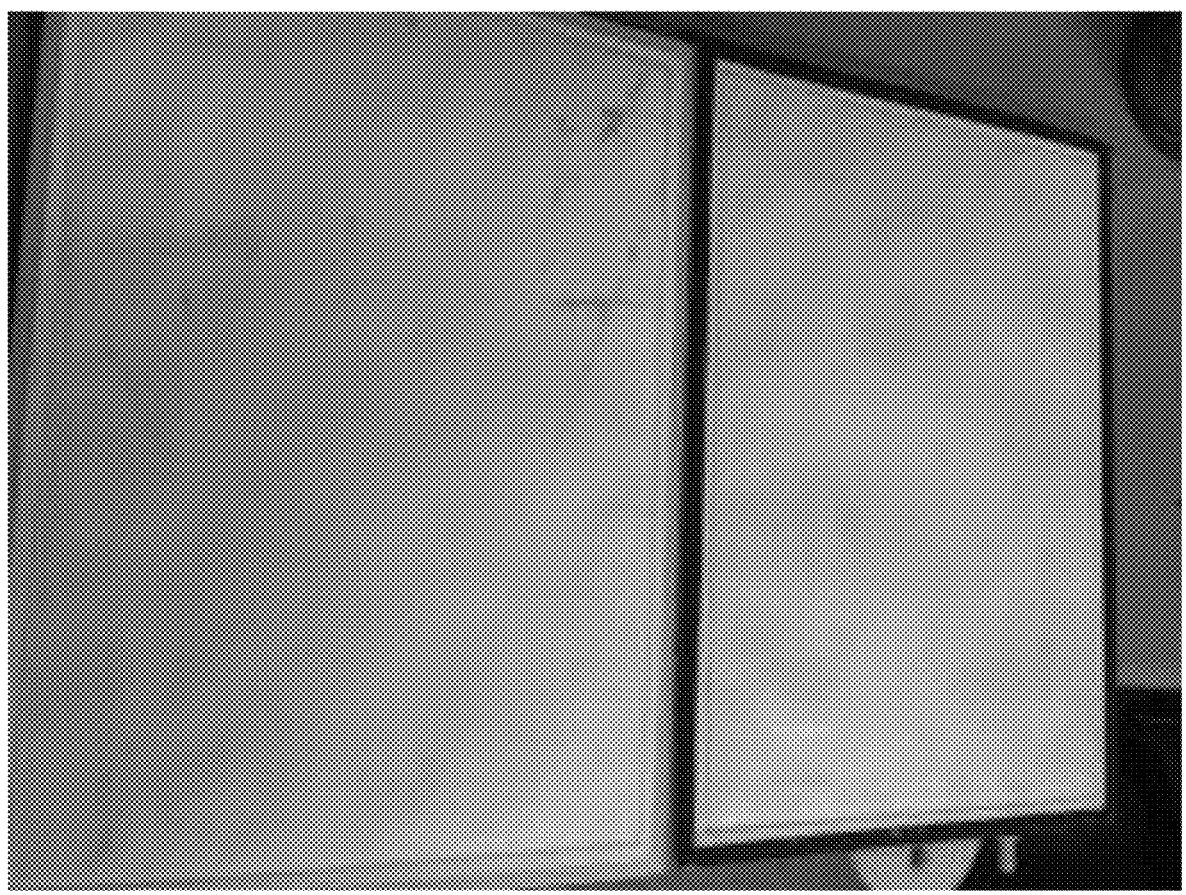
Figure 19:
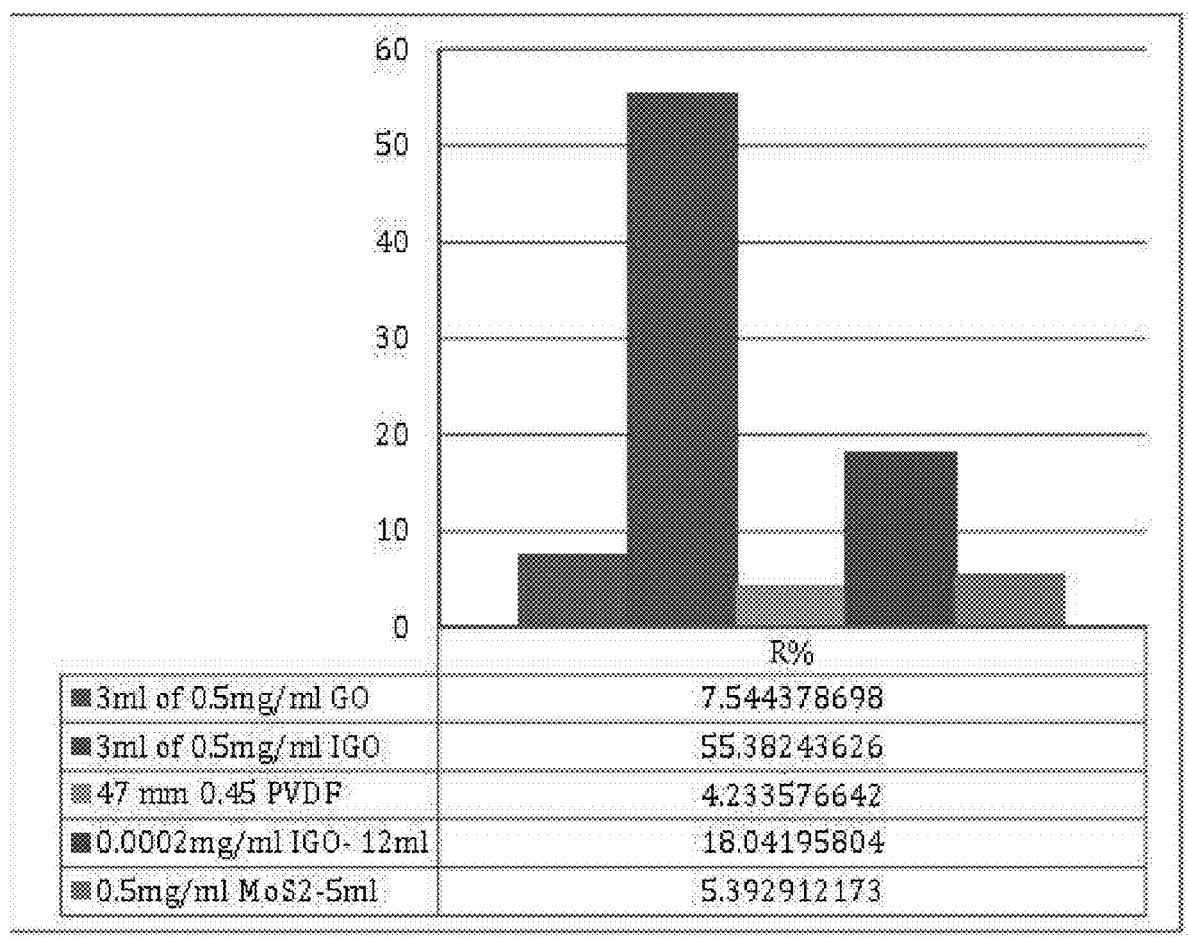
Figure 20:
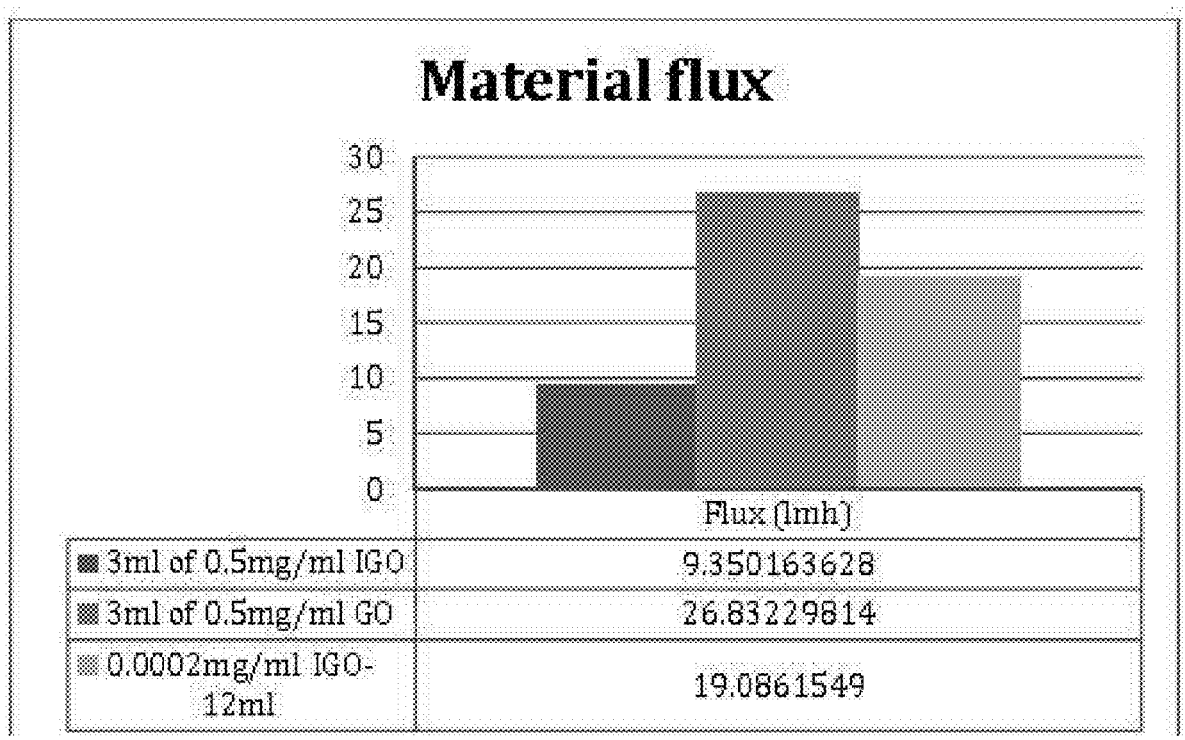
Figure 21:
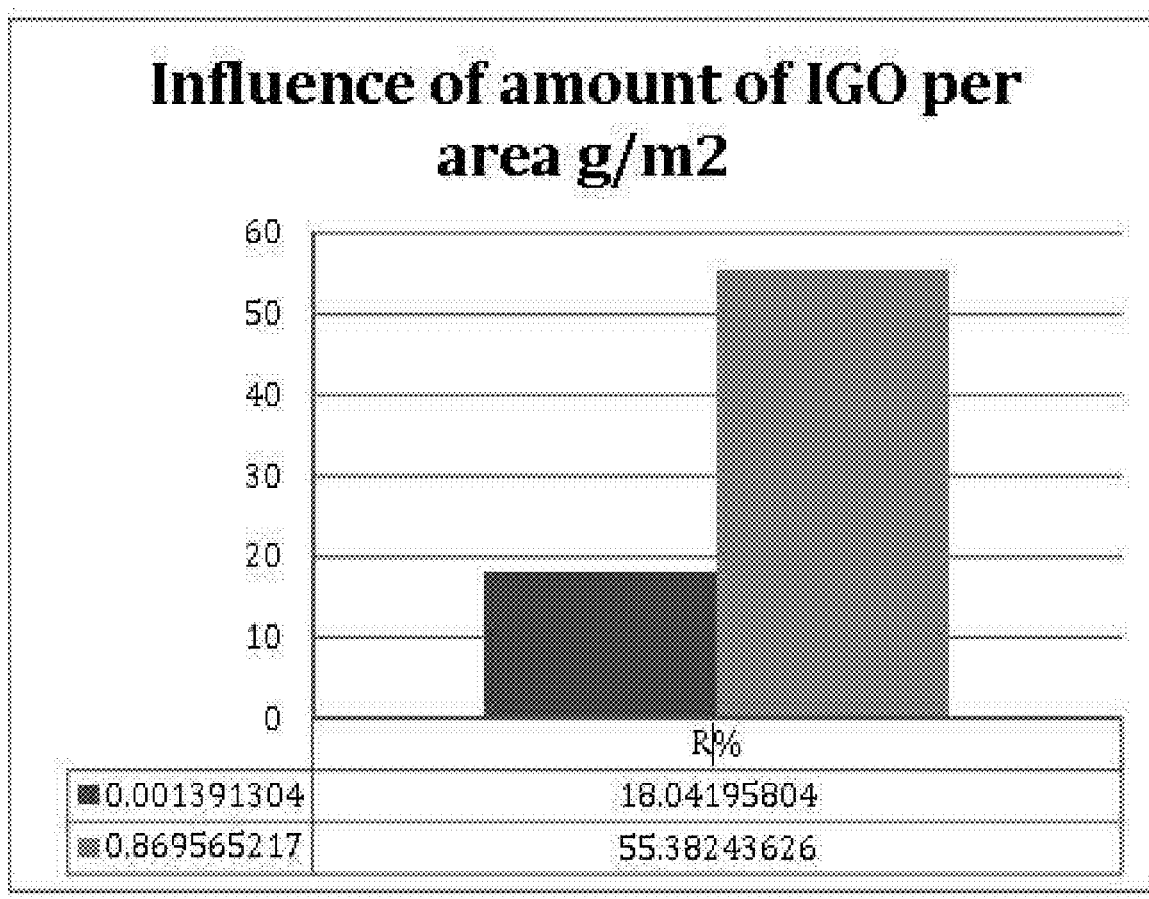
Figure 22:
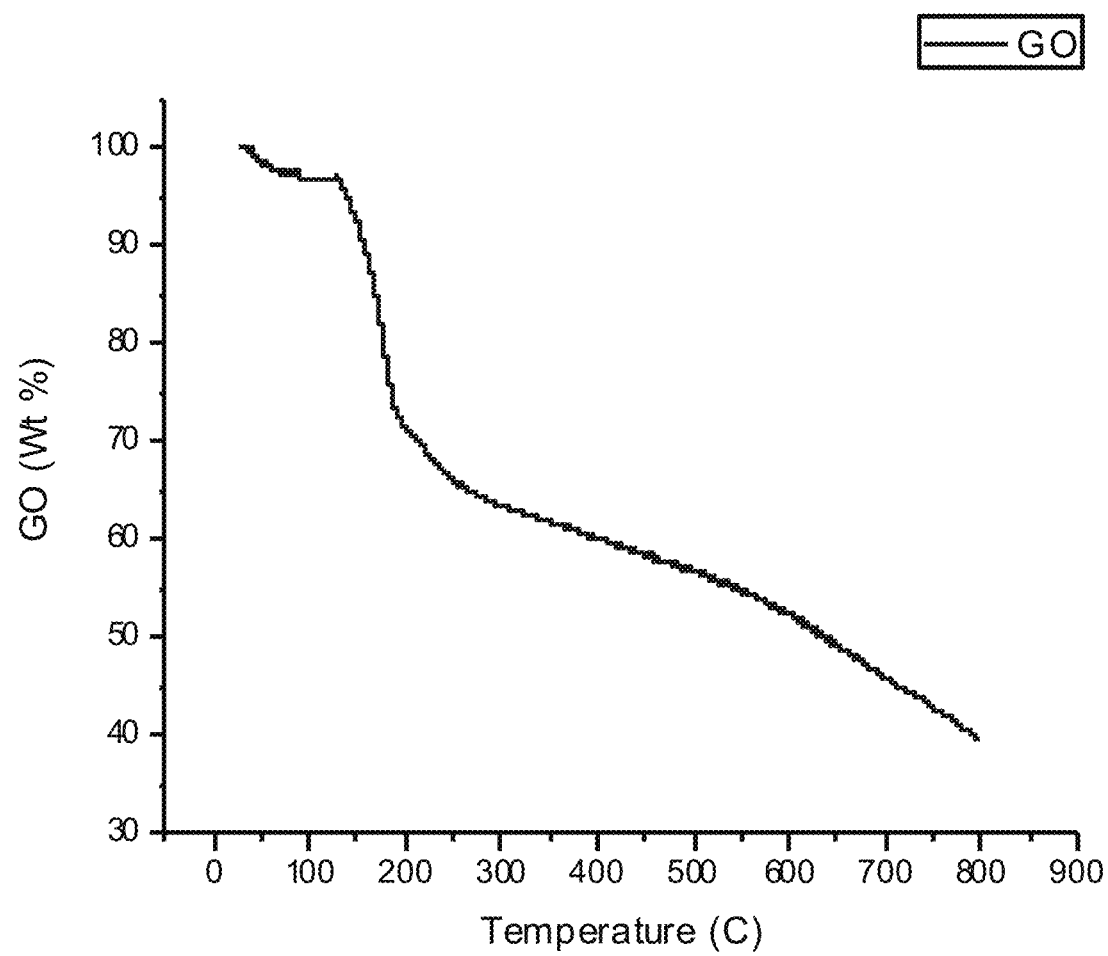
Figure 24A:
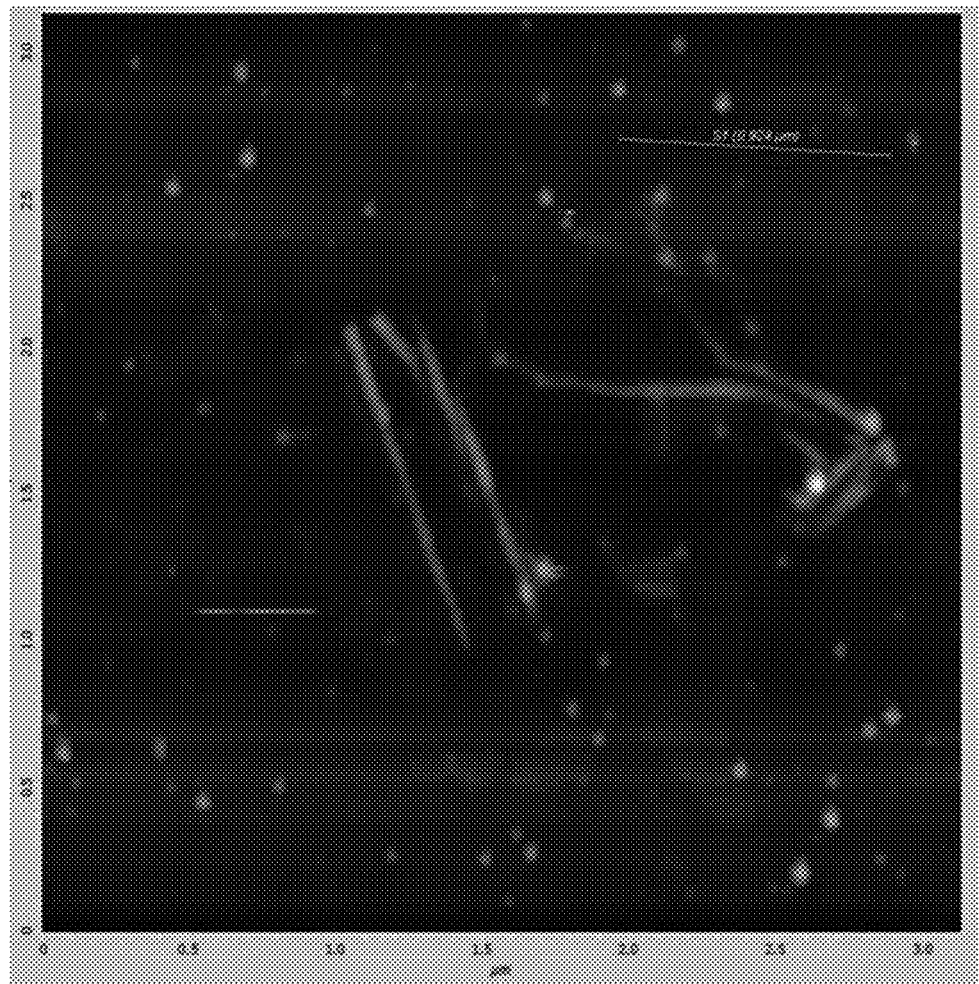
Figure 24B:
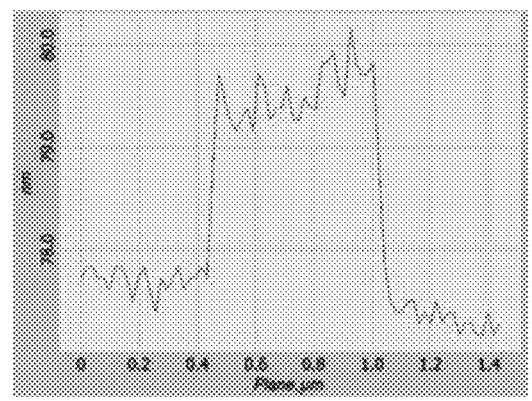
Figure 25:
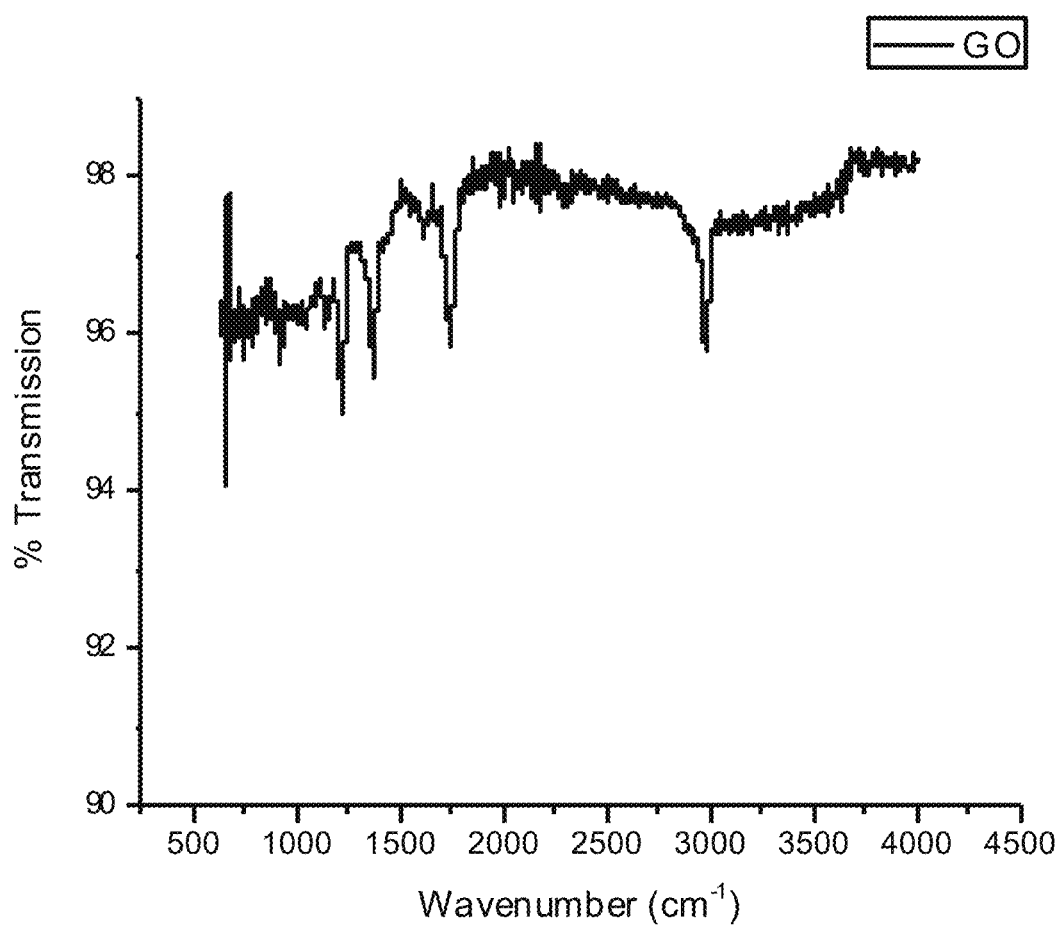
Figures 26A, 26B:
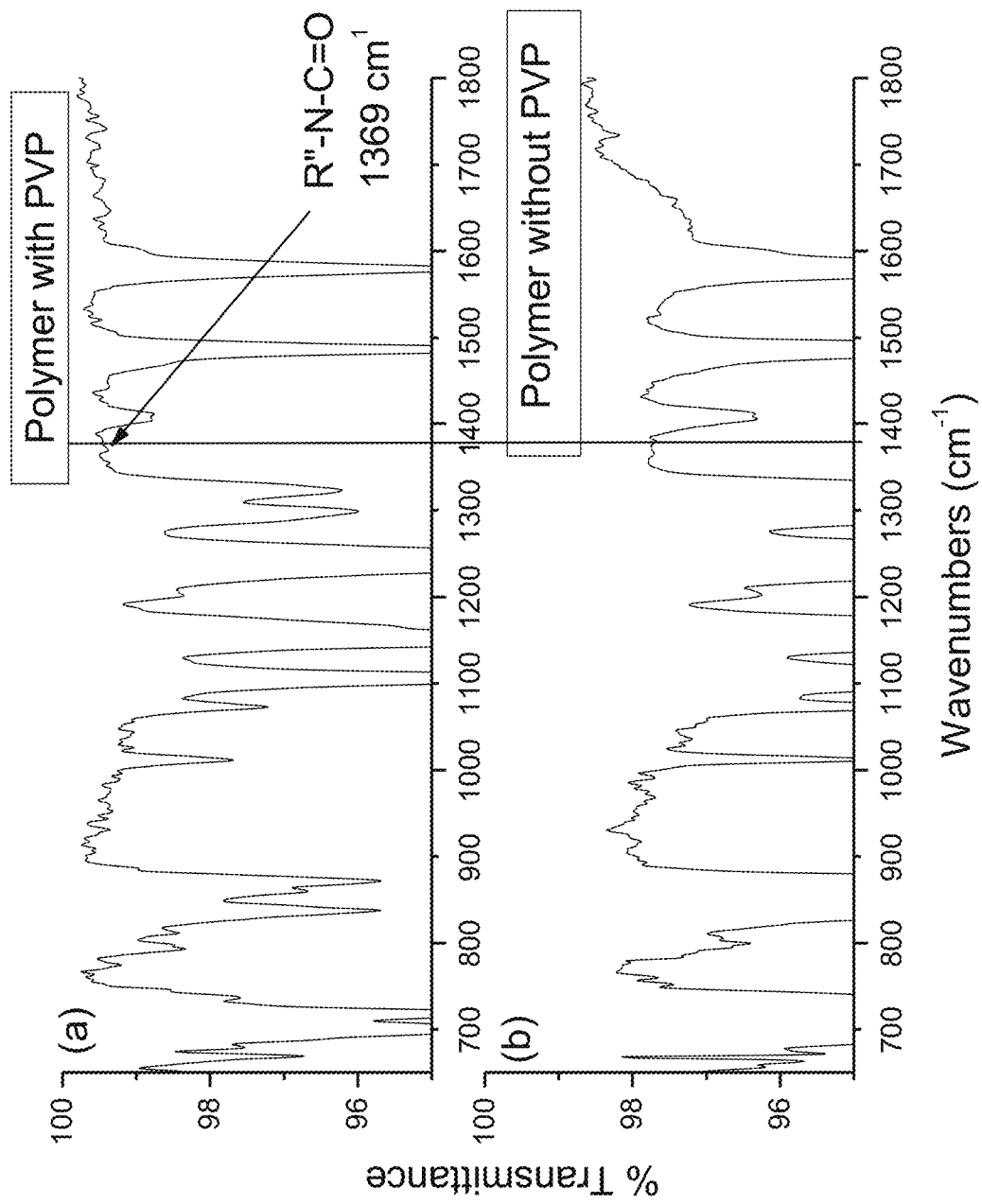
Figures 26C, 26D:
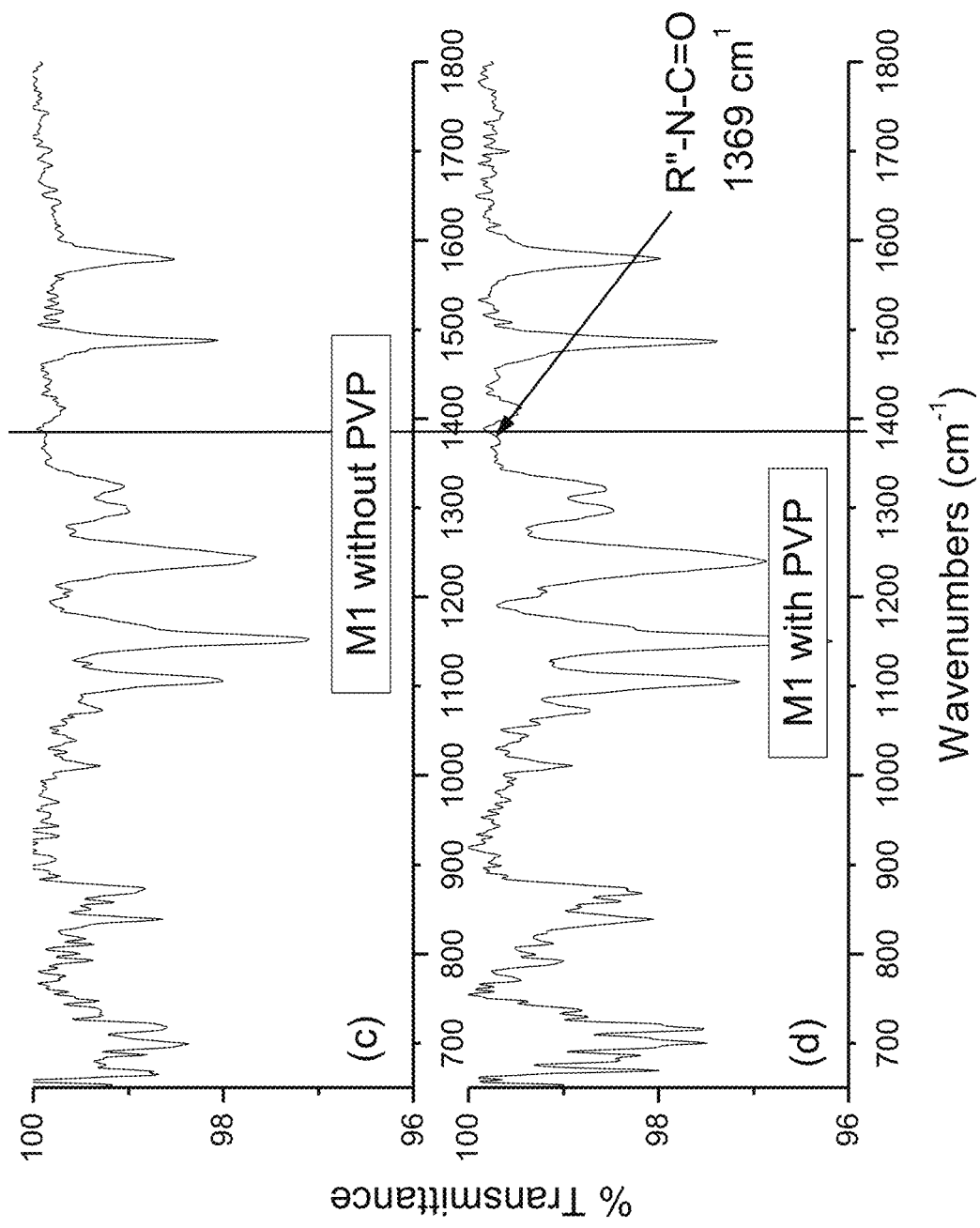
Figure 27:
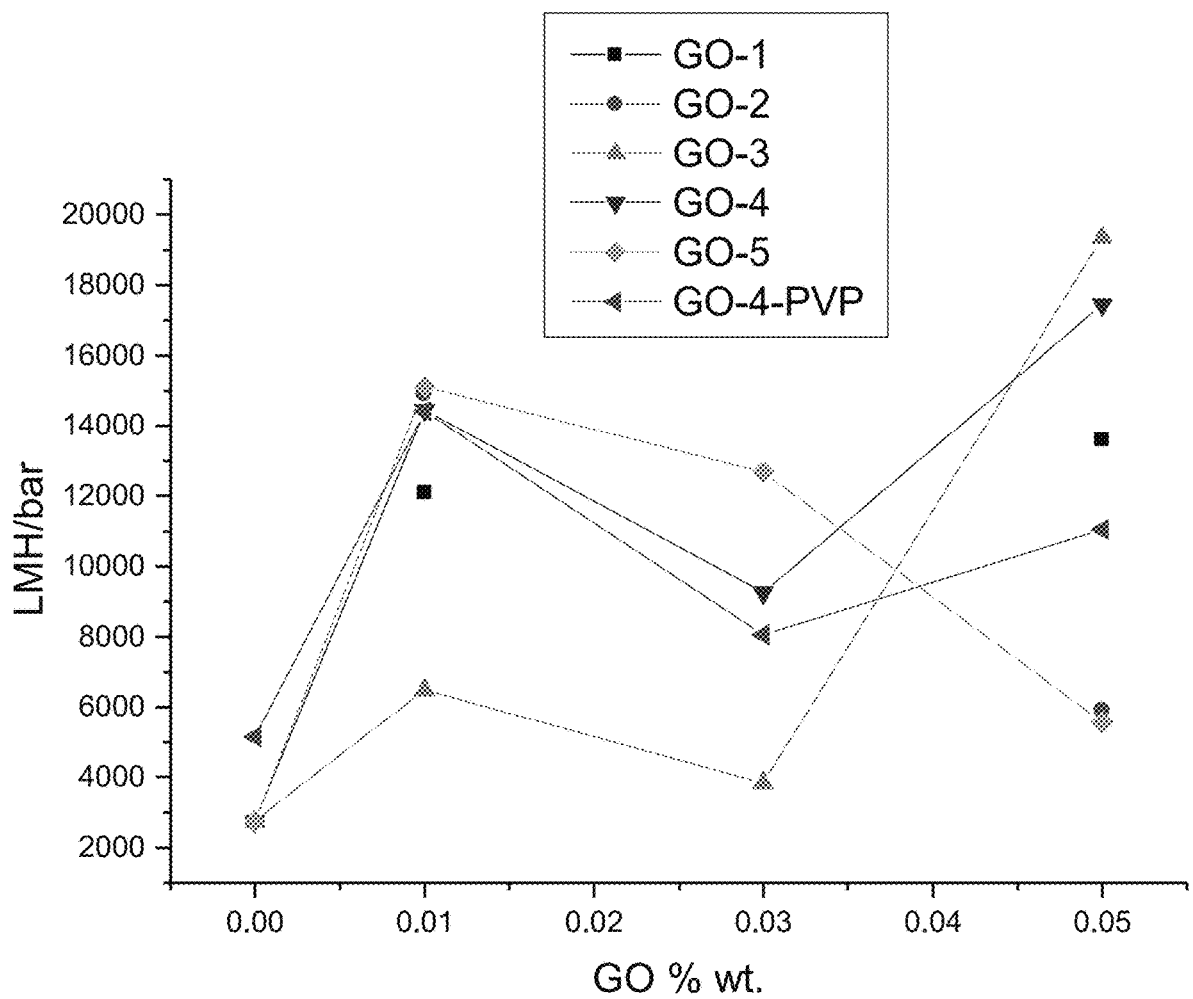
Figure 28:
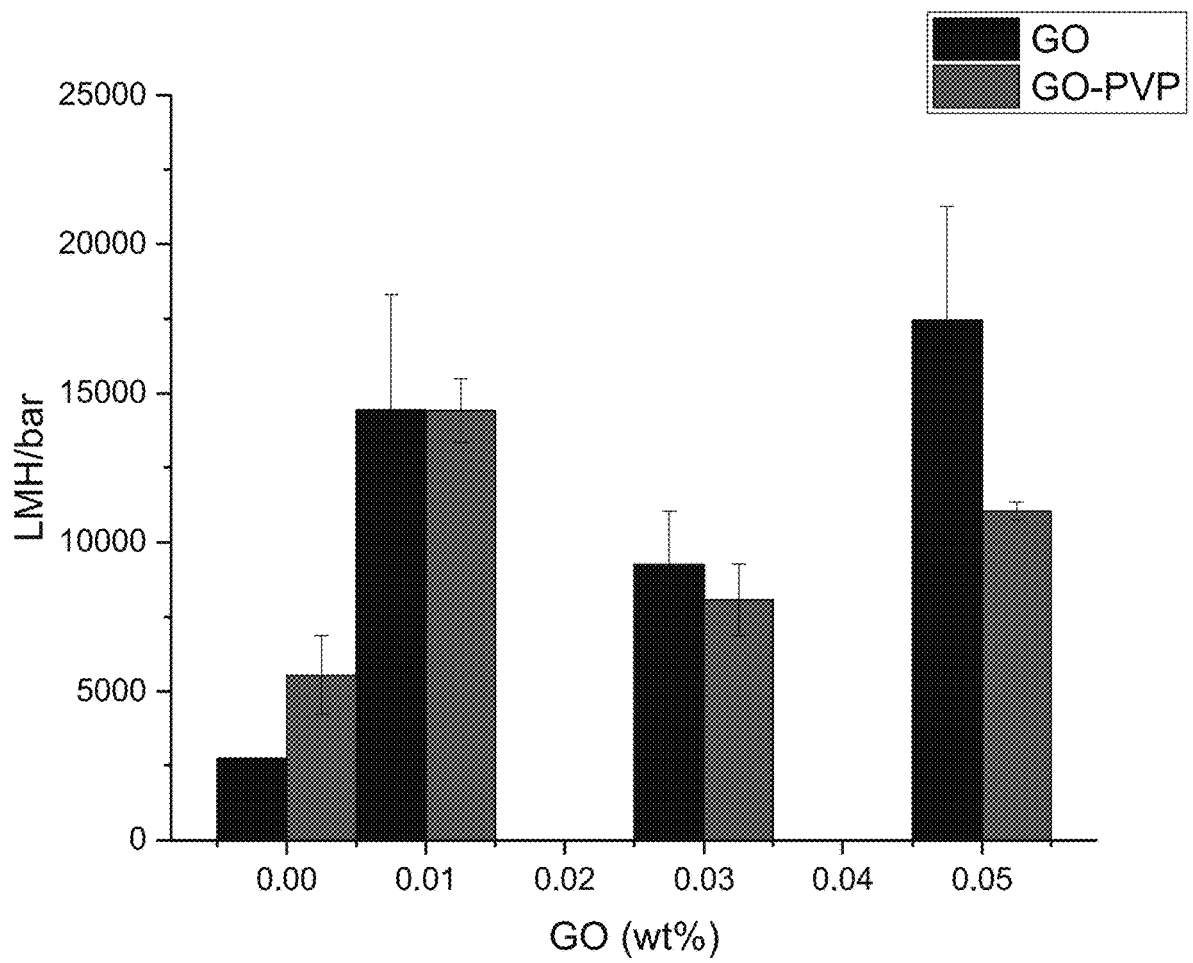
Figure 29:
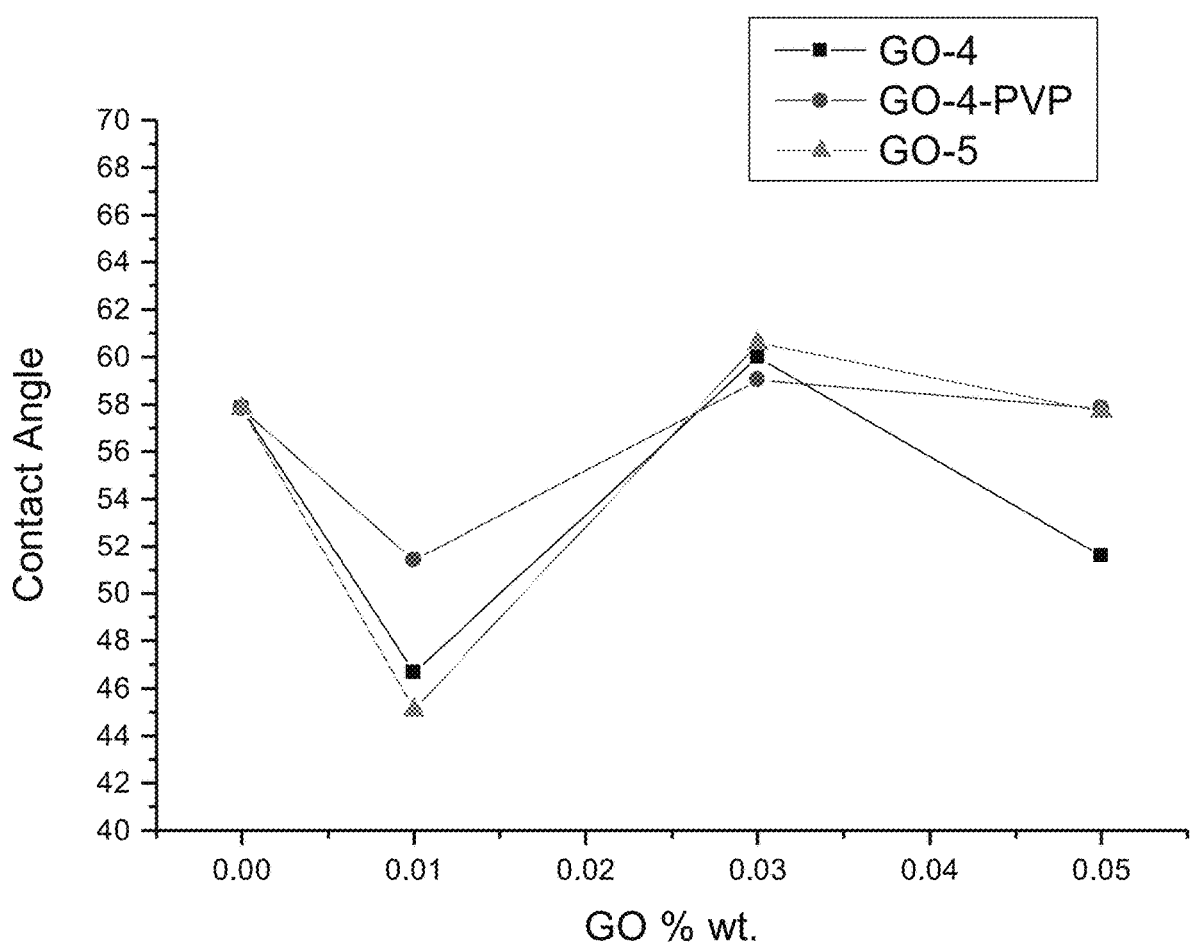
Figure 30:
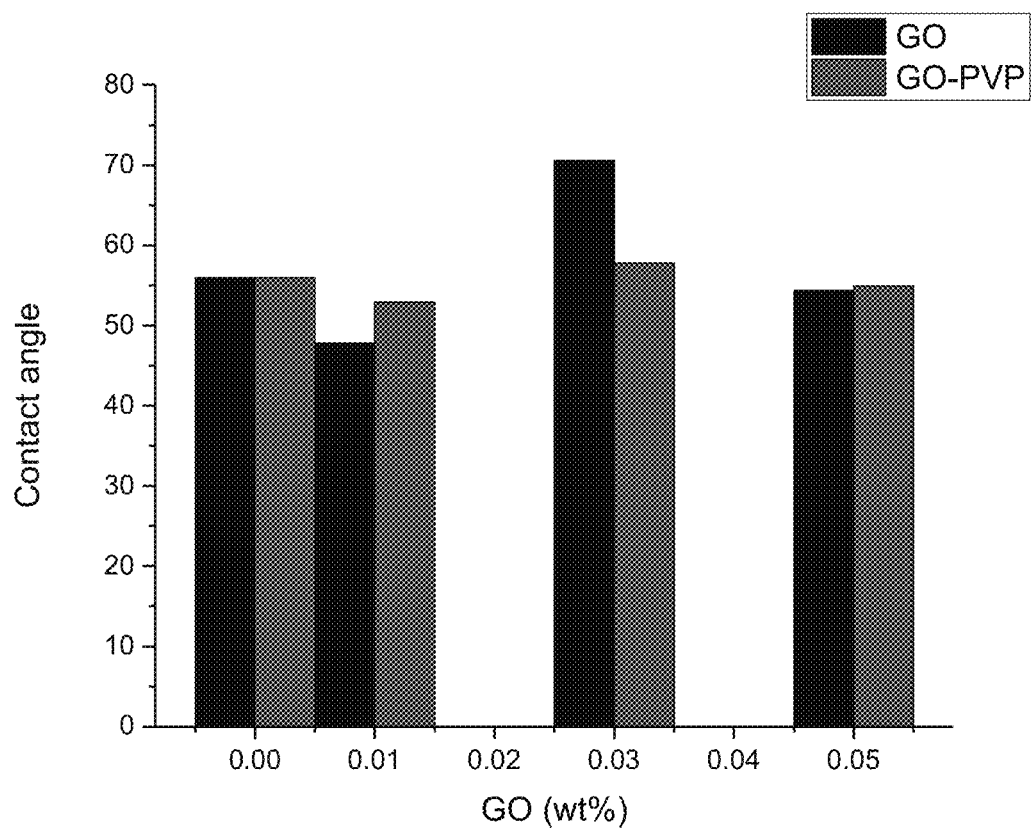
Figure 31:
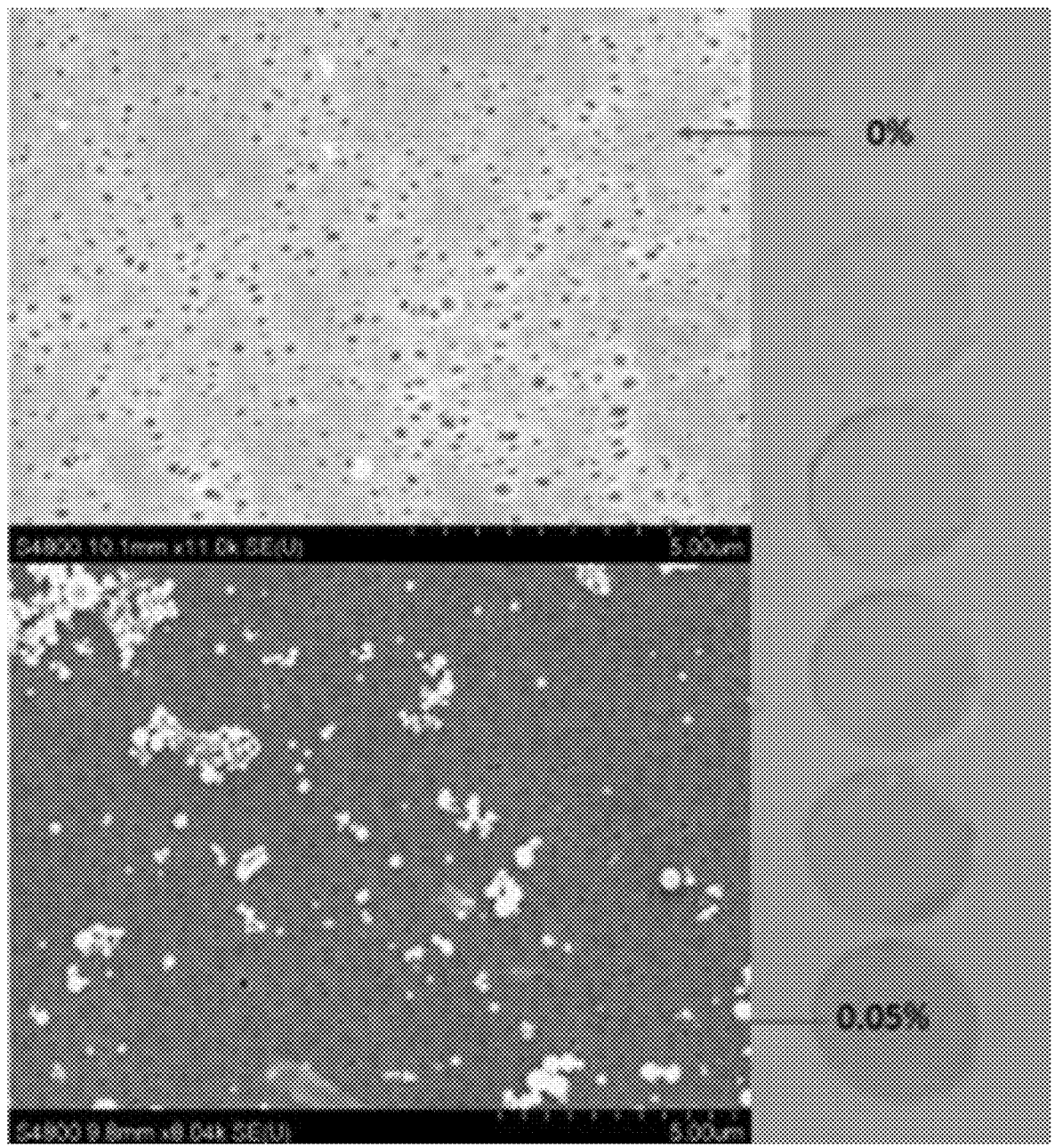
Figure 33:
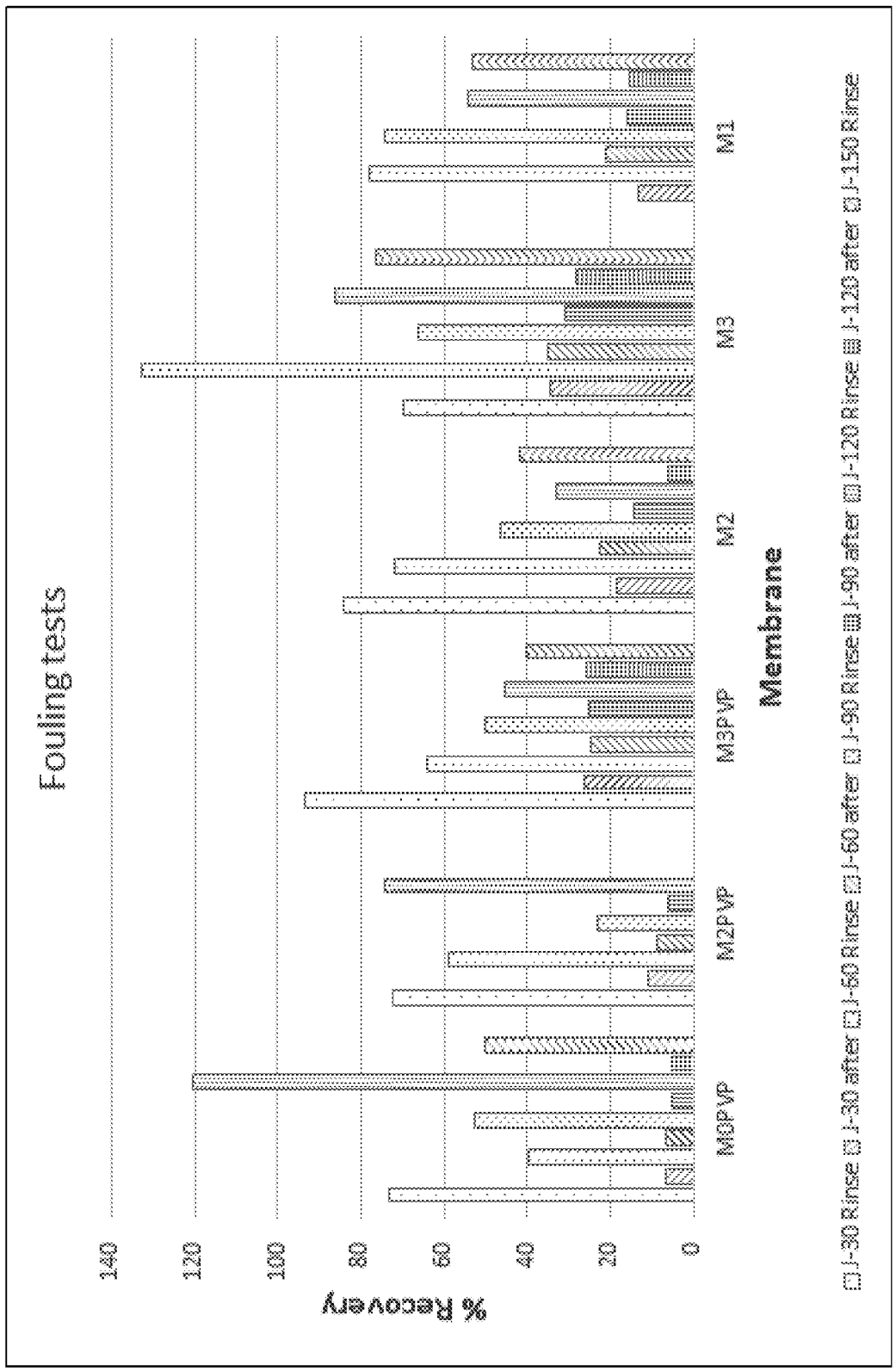
Figure 34:
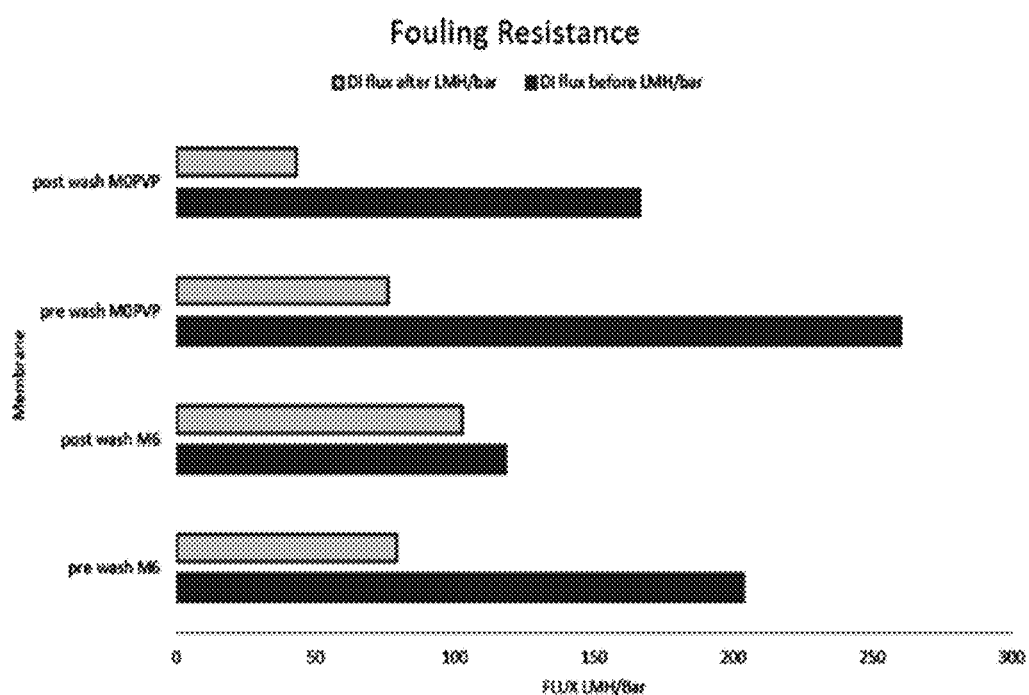

For a more complete understanding of the features and advantages of the present invention, reference is now made to the detailed description of the invention along with the accompanying figures and in which:

FIG. 1A a dead-end flow filtration apparatus that can be used with the filters of the present invention while FIG. 1B shows a cross-flow filtration apparatus for use with the present invention, FIG. 2 shows a filter of the present invention made by vacuum assisted assembly, FIG. 3 shows a nanocomposite filter that retains the surface energy of the substrate it was fabricated on, FIG. 4 shows the strength and flexibility of a filter of the present invention, FIG. 5 shows wastewater that includes grease prior to filtration (left, beaker) and after filtration using the present invention the filtrate (right, in the graduated cylinder), FIG. 6 is a graph of the material tap water flux in gallons per foot per day using membrane synthesized using Synthesis procedure 1, 2 and 3, FIG. 7 is a graph of the rejection of total dissolved solids from tap water using membrane synthesized using Synthesis procedure 1, 2 and 3, FIG. 8 shows wastewater from hydraulic fracturing prior to filtration (left, beaker) and after filtration using the present invention the filtrate (right, in the graduated cylinder), FIG. 9 is a plot of the percentage removal of total carbon, organic carbon, inorganic carbon, and total nitrogen, FIG. 10 is a plot of the rejection of total dissolved solids using membrane synthesized using Synthesis procedure 1, 2 and 3, FIG. 11 is a plot of the in gallons per foot per day using membrane synthesized using Synthesis procedure 1, 2 and 3, FIG. 12 is an image of a single layer material of the present invention, FIG. 13 is an Atomic Force Microscope (AFM) image of a single layer 1.5μm in diameter, FIG. 14A is an image of the AFM measurement of single layer thickness of a graphene oxide flake while FIG. 14B is an Atomic Force Microscope (AFM) image of a single layer graphene oxide flake with a ~2 nm height, FIG. 15A is an image of the stock solution of nanomaterial and FIG. 15B is an image of the dilute solution prepared for membrane deposition, FIG. 16A is an image of the preparation of flat sheet polypropylene and FIG. 16B is an image of leveled vacuum deposition chamber, FIG. 17 is an image of the untreated hydrophilic nanomaterial membrane on the right and the hydrophilic nanomaterial membrane pretreated with soap solution dried after deposition on the left, FIG. 18 is an image of the membrane with a nanomaterial thin film on the right and the membrane without nanomaterial on the left, FIG. 19 is a graph of the TDS testing % R for GO membranes, FIG. 20 is a graph of the material flux for GO membranes, FIG. 21 is a graph of the influence of the amount of IGO per area, FIG. 22 is a graph depicting the Thermal Gravimetric Analysis (TGA) of GO, FIGS. 23A-23D are graphs depicting the Thermal Gravimetric Analysis (TGA) of various synthesized GO samples, FIG. 24A depicts an Atomic Force Microscope (AFM) image of GO single layer flake on mica surface measuring ~1 nanometer in thickness while FIG. 24B is the respective height measurements of this AFM image, FIG. 25 is the FTIR from GO, FIGS. 26A-26D depicts the FTIR analysis of membranes M-0-PVP (polymer with PVP), M-0 (polymer without PVP), M-1 (M1 without PVP) and M-1-PV (M1 with PVP), FIG. 27 is a graph of the pure water flux of GO-PES composites with PVP (GO-4-PVP) and without PVP (GO-1 through GO-5), FIG. 28 is another graph of the pure water specific flux (permeance) of PES membranes with GO and GO-PVP, FIG. 29 is a graph of contact angle testing of various GO blended compositions, FIG. 30 is another graph of the contact angles of GO membranes and GO membranes with PVP, FIG. 31 illustrates SEM images of PES membranes with increasing concentration of GO, FIG. 32A and FIG. 32B are the SEM images of GO-PES membranes with and without PVP, FIG. 33 is a graph of the fouling tests with % recovery from various GO-PES membranes with and without PVP, and FIG. 34 is a graph of the normalized flux from experiments with powdered milk water as feed.

NOTATION AND NOMENCLATURE

Certain terms are used throughout the following description and claims to refer to particular system components and configurations. As one skilled in the art will appreciate, the same component may be referred to by different names. This document does not intend to distinguish between components that differ in name but not function.

The use of the word "a" or "an" when used in conjunction with the term "comprising" in the claims and/or the specification may mean "one," but it is also consistent with the meaning of "one or more," "at least one," and "one or more than one."

Throughout this application, the term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. Thus, they should be interpreted to mean "including, but not limited to . . . ."

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof as used herein refers to all permutations and combinations of the listed items preceding the term. For example, "A, B, C, or combinations thereof is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context. In certain embodiments, the present invention may also include methods and compositions in which the transition phrase "consisting essentially of or "consisting of" may also be used. As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. The same or similar parts may be marked with the same or similar reference numerals.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are described in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

The present disclosure is related to the purification of liquids and gases preferably and primarily intended for the disclosure is fluid purification. The present disclosure relates to a treatment system for removing waste or other agents from a fluid stream, the system includes an inlet flow path for receiving a fluid stream from a source outside the treatment system; a vessel for containing the fluid stream, the vessel comprising a permeable filter configured for biological and physical treatment of the fluid stream, the filter comprising one or more nano-thin film or polymer composite layers of carbon materials assembled in sp2 hybridized structures comprising carbon-carbon bonds, wherein the waste or agent is removed as it flows through pores in the film composite; and a drain fluidly connected to the vessel for discharging treated fluid stream from the vessel from which the waste or agents have been removed.

Graphite oxide is the precursor to graphene oxide and is chemically identical but structurally different. Graphite oxide is usually converted to graphene oxide using methods such as sonication and stirring to create a dispersion. If the solution used is polar than graphite oxide is exfoliated via the electronegative repulsion due to strongly negative charges between oxygen functional groups. These repulsion forces have been known to vary according to pH (B. C. Brodie, Philos. Trans. R. Soc. London, 1859, 149, 249-259) and have been exploited as a means of tuning interactions between water transport and rejection in membranes comprised of graphene oxide (Hubiao Huang, Chem. Commun., 2013, 49, 5963-5965).

As mentioned before, each method imparts differences in structure to the graphite oxide product which leaves some question and debate as to the definition of graphite oxide. Recent models reject the idea of a repeating lattice and accept a non-stoichiometric amorphous model described by Lerf and Klinowski (H. He, J. Klinowski, M. Forster and A. Lerf, Chem Phys. Lett., 1998, 287, 53-36) which increases the complexity surrounding the definition of graphite oxide and graphene oxide. Complexities surrounding graphene oxide itself depend further on methods of exfoliation (J. I. Paredes, S. Villar-Rodil, A. Martinez-Alanso and J. M. D Tascon, Langmuir, 2008, 24, 10560-10564). The degree of oxidation can be demonstrated using dispersion tests (Y. Si. And E. T. Samulski, Nano. Lett., 2008, 8, 1679-1682) and can also describe with increasing epoxide to alcohol ratio (D. W. Boukhvalov and M. I. Katsnelson, J. Am. Chem. Soc, 2008, 130, 10697-10701). Collectively, models accept that the products of oxidation are hydroxyl and epoxide groups on the basal plan of graphite oxide flakes and carboxylic acids on the edges (W. Cai, R. D. Piner, et al., Science, 2008, 321, 1815-1817) and these functionalities serve as reactive sites for functionalization or reduction. Moreover, the role of oxidization protocol fundamentally contributes to the structure, reactivity and overall function of graphite oxide. By restoring $\pi$ bonding, the electrical conductivity can be restored within graphene oxide. As mentioned, graphite oxide has mainly epoxides and alcohols on the basal planes. These are the primary sites for chemical reduction. However, reduction can also impart damage to the graphene basal planes and disrupt the lattice structure.

Most food processes in the industry are aqueous but in sometimes organic solvents are required. For treatment of aqueous streams around 300,000 m<2> of Nanofiltration-membranes are currently assumed to be applied in the food industry, mainly in the diary and industry. Solvents were first applied in the vegetable oil industry, where acetone (for triglyceride fractionation) and especially hexane (for oil extraction) are used; also in the synthesis of some food additives. Initial studies in the 1980s resulted in several large-scale trials, but the disappointing results have dampened the enthusiasm of researchers in the field. However, the large potential of membrane applications combined with new developments, re-initiated Solvent Resistant NF-research in this field over the past years. The main motives are the possibility to separate molecules in a customized manner, recycle solvents, reduce waste, and minimize thermal damage and lower energy consumption.

Membranes require much interdisciplinary knowledge in materials science and engineering, chemical synthesis, and skills in characterization for analytical purposes of evaluating membrane manufacturing, modification, and module design. A close integration between process-design in industrial application is imperative to addressing economical, ecological and health and safety issues.

Performance can be defined by the selectivity and the flux or permeation rate which is defined by the volume of liquid that flows through the membrane per unit are per unit time and is generally in units of 1/m<2>hr. Rejection can be defined as Cp-Cf/Cp where Cf and Cp denote feed and permeate concentrations. Separation performance is also evaluated by molecular weight cut-off (MWCO) usually identified using a reference compound 90% retained. It can be established by a curve showing membrane rejection of analytes with increasing molecular weights.

Although the performance of membranes has been studied by many authors, data in the literature is rather application-specific and difficult to compare. Specific properties of solutes and solvents (structure, size charge, concentration) as well as experimental parameters (pressure, temperature) make data very application specific and must be considered before interpreting data.

Most data was collected from dead-end filtration and is not necessarily reproducible in long term testing or under cross-flow filtration. A module type is used for most industrial applications sold containing spiral wound membranes. For upscale and industrial purposes operational strategies (batch, continuous, or diafiltration) should be considered for performance along with the design of membrane system (dead-end [DE], cross-flow [CF]). DE involves pressurization of feed with a gas. Gas dissolves in feed stream and expansion of soluble gas going from feed pressure to atmospheric pressure in permeate have not formally been studied. CF general displays high flux and although the effect of concentration polarization is unknown, fouling usually results in high selectivity and overall rejection.

FIG. 1A shows a dead-end flow filtration apparatus that can be used with the filters of the present invention. FIG. IB shows a cross-flow filtration apparatus for use with the present invention in which the various layers can be made to include pores of different sizes for size exclusion, and/or different functional groups that can provide size, charge, shape, or chemical specificity to the filter or parts of the filter of the present invention.

Fouling of membrane is defined by deposition of dissolved material on the external surface of the membrane or in its pore openings and pores. Concentration polarization is a fouling mechanism caused by accumulation of retained solutes and membrane boundary layer. This boundary layer concentration influences flux and rejection and can complicate data interpretation. A gel-like layer created by retained compounds increases osmotic pressure but is ultimately a reversible process controlled by technical modifications such as permeate pulsing, CF velocity and ultrasound.

A nano thin film composite material can be constructed from carbon materials, which are assemble in sp2 hybridized structures comprising carbon-carbon bonds. In other embodiments these structures may also comprise of graphene materials with heteroatoms such as oxygen, nitrogen, hydrogen, sulfur or other metal containing species. These carbon composite structures or graphene material membranes can have a variety of uses such as electrodes, sensors, lithium batteries, touch screens, photovoltaics and electronics.

In this particular embodiment, a material that is normally impermeable is made permeably through creation of nanopores; either from chemical doping with heteroatoms, chemical destruction of lattice by UV-Ozone treatments, chemical disruption of the lattice by bonding or by removal of areas using plasma, electron beam lithography. Also in this particular embodiment, this composite material can be made permeable through nanochannels with a variety of interlayer spacing associated to chemical functionalities. The composite intended for use can have one layer or have multiple layers. This composite may also be supported or unsupported.

The primary use of the invention is in the purification of grease trap interceptor waste. However, this invention is not limited to oil/water separation. It can also be shown to remove biological entities from waste effluents, also in the removal of chemical dyes, in the removal of heavy metals such as chromium and arsenic from water. It can also be shown to have an effect on the removal of radioactive waste from water.

Fluid purification is not limited to water and the particular invention may be applied to petrochemicals in the recovery of extraction solvents, removal of free fatty acids, desulfurization, deacidification, solvent recovery in lube dewaxing, isolation and concentration of pharmaceuticals, and in the concentration and purification of bioactive compounds.

The present invention is a nanomaterial comprised of graphene material, either multilayered or single layer; containing all sp2 hybridized carbon-carbon bonds or having heteroatoms like oxygen, sulfur, nitrogen, hydrogen or metallic species present within graphene sheets or containing nanochannels created from functionalities.

The material composite can be made into a single or multilayered thin layer composite (TFC) and offers an improvement over current technologies such as reverse osmosis filtration due to increases in flux and rejection of impurities.

Several novel methods for producing graphene from inexpensive materials are envisioned. Methods for producing these materials can involve the application of sonic or microwave energy during the production.

In one method, the present invention includes a membrane fabricated using PTFE filter resulting in a thick membrane. The total drying time for this membrane was >5 days which is very long (too long) and this is due to the fact the PTFE is hydrophobic and contributed to a very slow filtration. The result was a thick membrane, which was simply tested for basic permeation properties. The patterned front and back demonstrates unique properties belonging to thin sheets (e.g., single layer) of graphene stacking that maintains the shape of the backing used during the formation of the filter and that is removed from the membrane. Briefly, graphene oxide in solution is placed on a filter backing or substrate and the membrane is grown on the backing or substrate. The filter can be a single layer that is made porous by chemical, mechanical, electrical and/or electromechanical forces, multiple layers that are also made porous by the listed methods, and/or the various layers are formed together or separately and are then combined to form layers with various characteristics that provide variable filtration, e.g., for cross-flow filtration. Filtration can be driven by, e.g., gravity, gravity-assisted, counter-current filtration, pressure-assisted and/or driven by an electrical current, e.g., electroporation, or a chemical gradient. The membrane may include pores that are chemical or biological that can also provide specificity to filtration. Other methods for driving filtration can also be used with the filters of the present invention, as can pre-filtering layers that help eliminate small, medium or large solids that could foul the membrane (e.g., small particulates, sand, or rock, respectively).

In one embodiment, the filters are used in dead-end filtration, cross-flow filtration or spiral wound, combinations thereof and other configurations. The filters may be made by: using Nitric Acid and Sulfuric acid (2:1 v/v), $KMnO_4$ and Carbon, (e.g., Sigma Aldrich cat #33241 natural graphite flakes sieved to 420μιη and 250 ιη; SP-1Bay Carbon 30μιη graphite).

Three hydrocarbon composited can include: Hydrocarbon composite #1 Isolate with dodecane. Hydrocarbon composite #2 Isolated with heptane. Hydrocarbon composite #3 synthesized with maltenes. In operation, the filters may be made by: 1. Carbon (graphite) is added to acid and submerged in ice; 2. KMn04 is added over a period of time between 5 days and 30 min while stirring at a temperature between 35-65° C.; 3. The reaction of step 2 is poured into 200 ml of water and further stirred for a period of time between 15 min and 2 days; 4. The reaction in step 3 is quenched in 500 ml of water containing 3/4 (3/4 and recovered through filtration.

FIG. 2 shows a filter of the present invention made by vacuum assisted assembly.

FIG. 3 shows a nanocomposite filter that retains the surface energy of the substrate it was fabricated on.

FIG. 4 shows the strength and flexibility of a filter of the present invention.

FIG. 5 shows wastewater that includes grease prior to filtration (left, beaker) and after filtration using the present invention the filtrate (right, in the graduated cylinder).

Using the teachings of the present disclosure, it was found that the processed filtrate included Total Dissolved Solids (TDS) using EPA method 106.1 of 450 mg/ml before filtration and of 113 mg/ml after filtration.

Hydrazine was the first reported and although extensively characterized reduction (S. Stankovich, D. A. Dinkin, et. al., Carbon, 2007, 45, 1558-1565.), has no clear mechanism. C:O ratio was measured to be 10.3:1 in the instance of reduction of graphene oxide in solution between 80-100° C. (K. R. Koch, P. F. Krause, J. Chem. Ed., 1982, 59, 973-974) and a black precipitate was reported. The materials surface area was reported to be much lower than surface area measured for pristine graphene: 466 $m^2g^{-1}$ instead of 2620 $m^2g^{-1}$. It is hypothesized that the reduction process increases the hydrophobicity of the material by removal of polar groups and that exfoliation of platelets can become difficult. Additionally, hydrazine in particular is known for introducing heteroatomic impurities suck as nitrogen which can remain covalently bound to the surface of graphene oxide. This has a dopant effect creating n-type graphene as a result (S. J. Kanh, et. al, Nat. Nanotechol. 2007, 2, 230-236). C:N ratios as low as 16:1:1 have been shown in elemental analysis.

Sodium borohydride (NaBH4) is demonstrated to provide a more stable and effective reduction that Hydrazine. Its ability to reduce C=0 groups is more effective than its ability to reduce carboxylic acids and epoxides (H. J. Shin, et. al, Adv. Funct. Mater., 2009, 19, 1987-1992.) and the primary impurity produced in this reduction is alcohol groups. It can be hydrolyzed by water but usually if in excess, it can be effective in freshly prepared solutions.

Thermal reduction can be achieved by directly heating GO in a furnace or by heating in solution via hydrothermal reduction methods (J. N. Ding, et. al, Diamonds & Related Materials, 2012, 12, 11-15).

Experiments useful for characterizing properties of reduced product include Raman spectroscopy where D and G bands are observed as measurements of order/disorder of the structure and the stacking order, measurements of surface area using BET analysis and sheet resistance and bulk conductivity. ATM, XPS, SEM and TEM are also useful for determining platelet size, structure and thickness.

Examples of the various synthesis protocols of the present invention include: Synthesis procedure 1 includes: add 3 g graphite to 69 ml H2S04, on ice gradually add 9 g KMn04, stir for 2 hrs. at 35° C., add 130 ml H20 and stir for 15 min, add to 270 ml H20 and neutralize using H202, recover Graphite Oxide by filtration, and wash with HC1:H20 (1:10 v/v) until sulfate free. Synthesis procedure 2 includes: add 3 g graphite to H2S04:H3P04(9:1)-360 ml/40 ml, gradually add 18 g KMn04, stir for 12 hrs. at 45° C., pour over 400 ml ice after mixture cools to room temperature, neutralize using H202(3 ml), and wash with HC1:H20 (3:7 v/v) until sulfate free. Synthesis procedure 3 includes: add 3 g graphite to 400 ml to H2S04, after 10 min of stirring add (carefully) 3 g KMn04, add 3 g KMn04 each day for 3 more days (4 total), add to 500 ml ice and neutralize using H202, centrifuge first quench (4 hrs at >4000 rpm), and wash with HC1:H20 (1:10 v/v) until sulfate free. Synthesis procedure 4 includes: add 100 mg MoS2 to clean and DRY schlenk flask (50 ml), add 10 ml of n-butyllithium [use extreme caution with reagent], stir for 4 days, quench with 500 ml hexane and filter over 0.2 μm PTFE filter, and repeat 2× (total 1500 ml hexane). Synthesis procedure 5 includes: add 1000 mg MoS2 to clean and DRY schlenk flask (50 ml), add 10 ml of n-butyllithium [use extreme caution with reagent], stir for 4 days, quench with 500 ml hexane and filter over 0.2μιη PTFE filter, and repeat 2× (total 1500 ml hexane).

Sometimes samples become too thick to filter. The addition of 10-30% acid in solution can aid in filtration over 0.2μιη PTFE membranes. However, when it becomes difficult to filtrate over 2 Days and the solution is very thick, samples are washed by collection with DI into 200 ml solution, stirred for 1 hr. and centrifuged for 8000 rpm 10× and recollected with final filtration in acidic solution.

Each filter was rinsed with de-ionized water until free of ions (permeate had 0 ppm Total Dissolved Solids TDS). Then each filter was tested using water samples.

FIG. 6 is a graph of the material tap water flux in gallons per foot per day using membrane synthesized using Synthesis procedure 1, 2, and 3.

FIG. 7 is a graph of the rejection of total dissolved solids from tap water using membrane synthesized using Synthesis procedure 1, 2, and 3.

FIG. 8 shows wastewater from hydraulic fracturing prior to filtration (left, beaker) and after filtration using the present invention the filtrate (right, in the graduated cylinder).

Each filter was rinsed with de-ionized water until free of ions (permeate had 0 ppm Total Dissolved Solids TDS). Then each filter was tested using water samples. During filtration, the membranes were evaluated for flux and permeate samples were tested for TDS and then collected and sent to Inform Environmental for third party evaluation of hydrocarbons and nitrogen. Procedures are as follows: Water filtration will be performed using vacuum (>lbar); 100 ml will be collected from a 25 mm membrane; 30 ml of collected sample will be shipped with ice or freezer packs to Inform Environmental LLC for third party validation; and Initial screening for 35 volatile and non-volatile compounds.

TABLE 1

|  | Total Carbon (TC): Conc. (mg/L) | Std. Dev. (mg/L) | Inorganic Carbon (IC): Conc. (mg/L) | Std. Dev. (mg/L) |
| --- | --- | --- | --- | --- |
| Unfiltered | 425 | 6.44 | 225.3 | 3.63 |
| Filter 1 | 136.7 | 2.16 | 94.08 | 1.64 |
| Filter 2 | 359.4 | 6.8 | 202.8 | 1.59 |
| Filter 3 | 42.3 | 1.85 | 20.7 | 3.63 |
| Blank | not detected | not detected | not detected | not detected |
|  | Total Organic Carbon (TOC): Conc. (mg/L) | Std. Dev. (mg/L) | Total Nitrogen (TN) Conc. (mg/L) | Std. Dev. (mg/L) |
| Unfiltered | 199.7 | 7.39 | 247.1 | 3.92 |
| Filter 1 | 42.67 | 2.71 | 81.41 | 2.16 |
| Filter 2 | 156.5 | 6.98 | 220.7 | 5.48 |
| Filter 3 | 21.6 | 4.07 | 9.185 | 1.12 |
| Blank | not detected | not detected | not detected | not detected |

FIG. 9 is a plot of the percentage removal of total carbon, organic carbon, inorganic carbon, and total nitrogen.

FIG. 10 is a plot of the rejection of total dissolved solids using membrane synthesized using Synthesis procedure 1, 2, and 3. FIG. 11 is a plot of the in gallons per foot per day using membrane synthesized using Synthesis procedure 1, 2, and 3.

Pure water flux with de-ionized (DI) water is used in determining the specific flux of a membrane and typically is used in characterizing the performance of the membrane. However, in this report we determined the actual flux of the membrane using produced water samples instead of DI water.

In this study provides two different materials were screened for capacity to remove all contaminants. The main objective was to determine performance of different material in different quantities. Filter #1 and #3 were made of the same material synthesized using synthesis #1 but used in different quantities. Filter #2 was a similar material that was synthesized with a different protocol than material used in filter #1 and #3.

The present invention enables the reclamation of saleable products including dehydrated clean crude oil, fresh water, brine water at lower cost due to rapid prototyping providing flexibility for development to suit any feed waste streams, it can be paired to current water technologies to save energy and increase equipment lifetime and it allows low-risk heavy waste stream recycling for groundwater recharge.

The present invention provides scaling membranes of commercial size for use in membrane bioreactor. Membranes using nano-composites have been shown to filter water at a molecular scale and provide biocidal and anti-fouling applications due to its resistance to proteins and chlorine.

The present invention provides advanced tertiary treatments that consist of removal of suspended solids and dissolved solids, which include nutrients and disinfectant.

These treatments involve nitrogen and phosphorus removal by biological methods. The removal of organics and metals is done through carbon adsorption or chemical precipitation, then the further removal of suspended and dissolved solids is performed by filtration, coagulation, ion exchange, reverse osmosis and other techniques like ozone and UV light irradiation to remove biological agents. The present invention uses nanofiltration to allow water being passed through a thin film to remove biological pathogens and potentially avoid the overall biological treatment of wastewater and to reduced membrane biofouling, reduced need for aeration, increase the quality of effluent and reduce the energy use, carbon footprint and overall cost.

FIG. 12 is an image of a single layer material of the present invention.

FIG. 13 is an Atomic Force Microscope (AFM) image of a single layer 1.5μη in diameter.

FIG. 14A is an image of the AFM measurement of single layer thickness of a graphene oxide flake. FIG. 14B is an Atomic Force Microscope (AFM) image of a single layer graphene oxide flake with a ~2 nm height.

Table 2 below shows a summary of membrane and module configurations: available from prototype testing DS: Desalination, ED: Electrodialysis, PR: Process Recovery, WT: Water Treatment, WWT: Wastewater Treatment.

FIG. 18 is an image of the membrane with a nanomaterial thin film on the right and the membrane without nanomaterial on the left. FIG. 19 is a graph of the TDS testing % R for GO membranes.

FIG. 20 is a graph of the material flux for GO membranes.

FIG. 21 is a graph of the influence of the amount of IGO per area.

In yet another aspect of the disclosure, GO proved to be a suitable replacement for Poly (N-Vinyl) Pyrolidine (PVP) in hypochlorite resistant polyethersulfone (PES) membranes.

PES is widely used in separation fields due to its outstanding oxidative, thermal and hydrolytic stability and mechanical properties. The PES membranes are prepared by a phase inversion methods and have asymmetric structure. The final membrane structure is influenced by a number of variables that include the dope solution (concentration of the polymer, the solvent, additives, and temperature of PES solution) the non-solvent or the mixture of non-solvents, the coagulation bath, and humidity. The disadvantages related to PES are mainly due to its relatively hydrophobic character.

Membrane fouling is one of the primary concerns for membrane technology. The onset of fouling gives rise to a decline in the membranes' permeability reducing the flux. Membrane fouling is mainly caused by adsorption of par-

TABLE 2

| Membrane configuration | Module configuration or operating method | Driving force | Pore size | Common Applications | Example |
|---|---|---|---|---|---|
| Flat Sheet (FS) | Plate and frame (PF) | Pressure | MF/UF | WWT, EDI | Pall DT ™, Electrocell (EC) |
|  | Immersed membranes | Vacuum | MF/UF | iMBR | Kubota, Toray Membray, Mycrodyne Bio-Cel ®, Pure Envitech SBM |
|  | Spiral wound (SW) | Pressure | UF/RO | DS, PR | Dow Filmtec, Hydranautics, Toray Romembra, Woongjin CSM ® |
| Hollow Fiber (HF) | Contained in pressure vessels | Pressure | MF/UF/RO | WT, PR, etc. | Asahi Microza ®, Toyobo Hollowsep ®, GE ZW1500 |
|  | Immersed module without pressure vessels | Vacuum | MF/UF | WT, iMBR | GEZW500, Asahi Microza ®, Mitsubishi Sterapore ™, Econity |
| Tubular (TB) | Pressure filtration | Pressure | MF/UF | WWT, PR, sMBR | Koch Abcor ®, ITT PCI, |
|  | Vacuum filtration with bubbling | Vacuum | MF/UF | sMBR | Norit Airlift ™ |

The present invention provides membranes membrane fabrication using Kubota membranes. Nanomaterials are deposited using spin coating, spray coating, and vacuum deposition. In one embodiment, the membranes were formed using vacuum deposition with a special chamber designed to keep a solution reservoir and enable even deposition of nano-composite material.

FIG. 15A is an image of the stock solution of nanomaterial and FIG. 15B is an image of the dilute solution prepared for membrane deposition.

FIG. 16A is an image of the preparation of flat sheet polypropylene and FIG. 16B is an image of leveled vacuum deposition chamber.

FIG. 17 is an image of the untreated hydrophilic nanomaterial membrane on the right and the hydrophilic nanomaterial membrane pretreated with soap solution dried after deposition on the left.

ticles, nonpolar solutes, and bacteria. This problem in membrane filtration strongly influences energy demand, separation performance and membrane lifetime. For example, PES membranes are widely employed in biomedical fields such as medical devices used for blood purification (hemodialysis, hemodiafiltration, hemofiltration plasmapheresis and plasma collection). Proteins rapidly adsorb onto the surface of the PES membrane when in contact with blood and the adsorbed protein layer results in platelet adhesion, aggregation and coagulation. As a result of this incompatibility which leads to fouling, injections of anti-coagulants are needed during its clinical application.

It is a difficult combination to have an anti-fouling and hydrophilic additive. In some cases, hydrophilicity cause more fouling. Some literature has concluded that membrane fouling is directly related to hydrophobicity, however because of the complex number of variables, the opposite has also been reported.

Methods used for the modification of PES membranes include physical methods such as blending and surface-coating methods, and chemical methods including photo-induced grafting, gamma ray and beam induced grafting, plasma treatment and plasma-induced grafting, thermal-induced grafting and immobilization and surface-initiated atom transfer radical polymerization.

A method for the modification of PES membranes is disclosed which involves the physical method of blending with GO, rather than conventional blends using Poly (N-vinyl pyrrolidone (PVP). As disclosed herein, GO as an anti-fouling, hydrophilic additive in membrane fabrication, has superior characteristics as compared to conventional PES-PVP blends, making it the preferred composition for waste filtration.

PES membranes modified by blending are commonly made with co-polymers to improve hydrophilicity. PVP is a commonly used co-polymer that has been shown to improve flux characteristics and fouling characteristics.

Due to fouling, bleach solutions are used to chemically clean membranes and sodium hypochlorite is typically used in weak concentrations for oxidative cleaning. Although additives such as PVP typically constitutes less than 3% of the membrane material, it has a dramatic influence over the degradation of the membranes mechanical properties during oxidative cleaning processes. PVP has been shown to dislodge from polymers during oxidative cleaning processes i.e. during disinfection with bleach. This leads to irreversible fouling and destruction of the membranes mechanical properties and eventually the polymers hydrophobic nature is restored. The main mechanism involves PVP oxidation and dislodging from PES matrix by hydroxyl groups (OH) in pH ranges (7-8) showing the highest concentration of OH radicals. Thus, modification to PES-PVP blends are desirable to alleviate these detrimental effects.

Others in the art recently elucidated the influence of the PES concentration has on behavior of membranes fabricated with 2-10% PVP. Two sets of PES membranes were prepared using phase inversion method and were characterized. It was found the pure water flux correlated well with contact angle tests. With lower concentrations of PES, PVP enhanced membrane hydrophilicity and enhanced permeate flux whereas membranes fabricate using higher concentrations of PES demonstrated a point beyond which PVP loading created denser structures with lower fluxes. Thus, since the art teaches use of a very low concentration of PES for PVP loading to demonstrate the effects of PVP, very low concentrations of PES where used to demonstrate the effects of GO in the novel PES-GO blend disclosed herein.

Recently, researchers have explored the addition of graphene oxide (GO) as a nanocomposite element in polymers and its effects on morphology, barrier, and mechanical properties. GO strongly influences the mechanical properties of polymer membranes depending on the specific dispersion properties of the polymer. Also, due to its carbon structure, GO interacts with many polymer matrices.

However, high concentrations of GO can adversely affect modulus, strength and surface wettability. Various studies illustrating the properties of polymer/GO nanocomposite films indicated that the presence of GO nano-particles affects pore structure, surface roughness and surface wettability of the polymer membranes, which in turn correlated with the membrane permeability properties in gas or liquid separation processes. Thus, optimal blends of PES-GO are taught herein which have the desired anti-fouling properties without the adverse consequences on membrane functionality.

Depending on the cost of producing GO, use of GO may be attractive for many applications. Other research efforts investigated novel PES ultrafiltration (UF) membranes containing GO nano-platelets prepared by phase inversion methods. It has been determined that increasing GO concentration can increase viscosity leading to reduced pore radius and porosity and consequently reduced pure water flux Experiments to evaluate the performance of polymeric polyethersulfone (PES) membranes with embedded graphene oxide (GO) were used to determine the role GO may play when compared to or combined with PVP. Such experiments required the production of PES membranes with GO and PES membranes with both GO and PVP.

Graphene Oxide:

Graphene oxide was synthesized via different methods using different graphite sources. GOs are denoted as GO-1, GO-2, GO-3, and GO-4. Briefly, one skilled in the art would appreciate that each method imparts differences in structure to the graphite oxide product which leaves some question and debate as to the definition of graphite oxide and illustrates the non-obvious nature of the disclosure.

TABLE 3

Preparation and synthesis of nanocomposite

| GO | Oxidation | Graphite |
|---|---|---|
| GO-1 | $KMnO_4$, $H_2SO_4$ for 2 hrs | Small sifted #1 |
| GO-2 | $KMnO_4$, $H_2SO_4$ for 2 hrs | Large sifted #2 |
| GO-3 | $KMnO_4$, $H_2SO_4$, $H_3PO_4$ for 12 hrs | Small Sifted #1 |
| GO-4 | $KMnO_4$, $H_2SO_4$, $H_3PO_4$ for 12 hrs | Large sifted #2 |
| GO-5 | ACS Commercial materials | Commercial |

As noted in the last column in Table 3 above, graphite flakes were sifted using meshes of 30 microns and 450 microns which resulted in large and small graphite flakes.

Graphite powders (Bay Carbon, Michigan, and Sigma Aldrich) were used to synthesize graphene oxide. Potassium permanganate (K2MnO4, Sigma-Aldrich), phosphoric acid (H3PO4 98.0%, Sigma-Aldrich), concentrated sulfuric acid (H2SO4, 98%, Sigma-Aldrich), and hydrogen peroxide solution ($H_2O_2$, 30% w/w in $H_2O$, Sigma-Aldrich) were employed as oxidizers at different stages of the synthesis. Polyethersulfone (PES) pellets (Goodfellow) were used along with N-methyl-2-pyrrolidine (BDH) and Poly (N-Vinyl) Pyrolidine (PVP M.W. 29 kDa, Sigma Aldrich) to fabricate membranes.

Graphene Oxide:

Graphene oxide (GO) nanoflakes were synthesized using Hummers method. Briefly, 3 g of graphite (Sigma Aldrich) was mixed with 70 mL of concentrated Sulfuric Acid (BDH) and 8 g of potassium permanganate was added.

PES Membranes—

GO was prepared by sonicating GO nanoflakes in N-methyl-2-pyrrolidone (NMP) at a concentration of 1 mg/mL. Typically, GO-PES was prepared by sonicating GO nano flakes in NMP (1 mg/ml) and adding to the polymer, dope in concentrations organized as in Table 4. A solution of PES polymer and nanoflakes is made by dissolving polymer pellets in NMP. Solutions were stirred at 50° C. for 1 hr. and degassed prior to deposition. Solutions were cast on a glass plate and submerged in DI water that was between 0-10° C.

PES membranes were fabricated with various concentrations of GO in the dope solution and with or without PVP (1% w/w), as shown in Table 4 below.

TABLE 4

Membrane testing parameters prepared from GO

| Membrane | PES (wt %) | GO (wt %) | PVP (wt %) |
| --- | --- | --- | --- |
| M0 | 10 | 0 | 0 |
| M0PVP | 10 | 0 | 1 |
| M1 | 10 | 0.01 | 0 |
| M2 | 10 | 0.03 | 0 |
| M3 | 10 | 0.05 | 0 |
| M4 | 10 | 0.01 | 1 |
| M5 | 10 | 0.03 | 1 |
| M6 | 10 | 0.05 | 1 |

Membrane Testing—

Pure water flux was measured using vacuum filtration. Fouling tests were performed in a dead end filtration unit (XFUF04701 Ultrafiltration Stirred Cell, 47 m Millipore) using 8000 mg/L solution of powdered milk solution. Consecutive testing was performed for 30 minute successions with DI water before each succession. Ageing and chemical resistance to hypochlorite was analyzed using static soaking.

The procedure consisted of soaking the membranes, without stirring, at ambient temperature (20-23° C.) in hypochlorite solutions at a total free chlorine concentration of 350 mg/L. This concentration was chosen as it has previously been determined to correspond with the maximum concentration to which membranes are potentially subjected during chemical cleaning at drinking water production plant. Exposure times ranged from 24 hrs. to 144 hrs. The pH of the soaking solutions was adjusted to 8.

GO Characterization:

Thermal Gravimetric Analysis—

TGA is a method to analyze functional groups in materials by increasing the temperature under inert atmosphere and measuring weight loss. To verify synthesis and identify individual GO characteristics due to functionalities, each GO material was tested using TGA.

As a compliment to FTIR as described herein, Thermal Gravimetric Analysis (TGA) revealed significant degradation of the GO material between 150-350° C. (see FIG. 22) due to oxygen containing groups leaving the material. Further degradation occurred between 450° C. and 900° C., which is a region of pyrolysis related to unstable carbon structure.

FIGS. 23A-23D shows differences between each GO (see Table 3) relating to properties such as oxidation [denoted as weight loss below 350° C.] and stability [denoted as weight loss above 350° C.].

Atomic Force Microscope—

AFM is capable of detecting sub-atomic distances using a cantilever on a feedback loop and used to characterize GO flakes for 1 nanometer thickness that is characteristic of graphene and graphene oxide. GO samples (X mg) were analyzed by atomic force microscopy (NT-MDT, NTEGRA, Software Version). Height profile was taken by adding 0.02 mg/ml GO solution in water to a freshly cleaved mica substrate. A representative sample (data not shown) has heights averaging between 1-2 nm, indicating that single layer exfoliation was achieved.

FIGS. 24A-24B illustrates AFM analysis of GO membranes and shows that the GO synthesized was indeed graphene in its 2-D nature as opposed to graphite oxide which has several layers and 3-D characteristics as opposed to 2-D characteristics.

FTIR Analysis:

Spectroscopy from Fourier Transform Infrared (FTIR) revealed that the graphite powder was oxidized with all the well-known functional groups in GO. As shown FIG. 25, peaks between 3200-2900 cm$^{-1}$ show the strong presence of hydroxyl groups. Peaks at 1750 cm$^{-1}$ show the presence of carboxyl groups between 1650-1550 cm$^{-1}$. The spectra show strong peaks due to carbon double bonds and between 1090-990 cm$^{-1}$ peaks are present for ether groups.

As shown in FIGS. 26A-26D, in membrane M0, C—H stretching for PES was recorded at 3097 cm$^{-1}$, between 1600-1400 cm$^{-1}$ three peaks (1578, 1486, 1406 cm$^{-1}$) were attributed to aromatic skeletal vibration. The ether (C—O—C) stretching peaks were recorded at 1323 and 1241 cm$^{-1}$. The S=O stretching peaks was located at 1151 and 1106 cm-1. For M0-PVP membrane, it was found that all the above peaks in same bands including new peaks at 1369 cm$^{-1}$ attributed for amide group in PVP.

In comparison of PES and PES with GO, the IR spectrum shows additional peak for the presence of GO along with PES. It was found that PES characteristics peaks present at 1578, 1486, 1406, 1323, 1241, 1151 and 1106 cm$^{-1}$ in M1, M2 and M3 which were at same bands as M0. The graphs show the OH stretching vibration at 3450 cm$^{-1}$, C=O carbonyl stretching at 1724 cm$^{-1}$ for graphene oxide loading in PES. For either M1, M2 or M3, analysis has not identified any peaks around 1369 cm$^{-1}$ which is a characteristic peak for the presence of PVP only.

Pure Water Flux:

The results shown in FIG. 27 show a wide variation between GO's 1-5 specific flux (LMH/bar) performance; again illustrating the non-obviousness of the addition of GO to PES mixed matrix membranes. It is unclear whether the addition of general "GO" is an improvement. It seems specific to the size and oxidation of the GO as to whether it is an improvement in the hydrophilic character.

Similarly, as illustrated by the graph in FIG. 28 which is based on similar data as in FIG. 27, pure water flux was also shown to have the highest points at 0.01 and 0.05% GO for both membranes with and without PVP. The pure water flux was lowest in the unfilled PES/PVP membrane demonstrating that GO is an improvement. However, as the GO weight percent increases the flux is highest when no PVP is present. This data indicates that GO represents a hydrophilic nature that exceeds PVP. Interestingly, the 0.03% GO shows a slightly faster flux than its PVP-filled counterpart which is surprising considering that its contact angle was shown to be larger than the PVP-filled counterpart.

Contact Angle:

Contact angle testing is inversely related to the flux and higher contact angles demonstrate higher surface energies between water and the membrane and therefore a lower flux.

Results from contact angle testing shown in FIG. 29 verify the variance between the concentration and type of GO and the difference in surface chemistry impacting hydrophilic properties. GO-4 shows a clear decrease in surface energy compared to its PVP counterpart at concentration 0.01% wt and 0.05% wt. GO-5 does not differ too much from GO-4 except at 0.05% wt where it is evidently no improvement over GO-4-PVP. Moreover, it is imperative that these intrinsic differences be noted as one skilled in the art of GO synthesis and membrane fabrication can appreciate.

As illustrated by FIG. 30, water was shown to have the lowest contact angles at 0.01 and 0.05% GO for both membranes with and without PVP. However, the 0.01% wt. GO membrane shows a lower contact angle than its GO-PVP-filled counterpart. The 0.05% GO shows a slightly lower contact angle than its PVP-filled counterpart.

FIG. 31 illustrates SEM images of PES membranes (top and bottom left) with increasing concentration of GO (right %). SEM images of PES membranes with increasing concentration of GO (0-0.05% wt) on the right and corresponding Scanning Electron Microscope microstructure images on the left.

FIG. 32A is an SEM image of GO-PES membranes with PVP and FIG. 32B is an SEM image of GO-PES membranes without PVP.

Fouling:

Fouling experiments were run for 3 hours at 30 minute intervals, in between which the membrane was rinsed with De-Ionized (DI) water to reproduce backwashing in an industrialized membrane system. Results shown in FIG. 33 have been normalized by taking each membrane and dividing the flux measured at each interval by its initial flux. Fouling experiments were done using powdered milk water as feed.

By this comparison, it can be seen that each membrane degrades in stages regardless of the starting flux (LMH) and cross compare directly the performance of each fabricated membrane. Normalized flux from the fouling experiments clearly shows that GO represents an advantage over 1% PVP as illustrated by FIG. 33.

The lowest points represented by $J/J_0$ were represented by the PES membrane containing GO. On the other hand, the best results came from membranes containing only GO. This indicates that GO is not only a competitive hydrophilic, anti-fouling additive, but that at 20 times less concentration than PVP, it is an actual improvement with respect to maintaining a sustainable flux.

The data shows that PES membranes containing just PVP denoted as M0-PVP have a far lower recovery rate and permeability over time than membranes containing GO-4. Membranes containing GO-4 in the absence of PVP outperform their PVP-containing counterparts by a significant consistent margin. This indicates that GO is not only a competitive hydrophilic, anti-fouling additive, but that at 20 times less concentration than PVP, GO is also an actual improvement with respect to maintaining a sustainable flux.

This is further illustrated by the results in FIG. 34, which consolidate data about DI Water flux before and after fouling experiments. Specifically, data is shown from pre and post chemical treatment with 350 ppm free chlorine for 24 hrs.

This is the first report of this novel methodology and related novel compositions: adding GO as a substitute for PVP which results in a PES-GO polymer blend with superior anti-fouling properties.

It is contemplated that any embodiment discussed in this specification can be implemented with respect to any method, kit, reagent, or composition of the invention, and vice versa. Furthermore, compositions of the invention can be used to achieve methods of the invention.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered.

This disclosure may include descriptions of various benefits and advantages that may be provided by various embodiments. One, some, all, or different benefits or advantages may be provided by different embodiments. In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. An anti-fouling wastewater filter composition comprising a polymer composite of polyethersulfone (PES) and 0.01 to 0.03 weight percent of graphene oxide, wherein the anti-fouling wastewater filter composition does not contain poly (N-vinyl) pyrolidine (PVP).

2. The composition of claim 1, wherein the graphene oxide comprise one or more heteroatoms selected from nitrogen, sulfur, or one or more metals.

3. The graphene material of claim 1, wherein the graphene oxide have a dimension of from about 0.01 μm to about 100 μm.

* * * * *